(12) United States Patent  
Kita

(10) Patent No.: US 9,171,351 B2  
(45) Date of Patent: Oct. 27, 2015

(54) IMAGE PROCESSING DEVICE THAT SYNTHESIZES IMAGE

(75) Inventor: Kazunori Kita, Tokyo (JP)

(73) Assignee: CASIO COMPUTER CO., LTD., Tokyo (JP)

(*) Notice: Subject to any disclaimer, the term of this patent is extended or adjusted under 35 U.S.C. 154(b) by 195 days.

(21) Appl. No.: 13/606,798

(22) Filed: Sep. 7, 2012

(65) Prior Publication Data

US 2013/0063485 A1 Mar. 14, 2013

(30) Foreign Application Priority Data

Sep. 13, 2011 (JP) ................. 2011-198975

(51) Int. Cl.
*G06T 3/40* (2006.01)
*H04N 5/232* (2006.01)
*G06T 7/00* (2006.01)

(52) U.S. Cl.
CPC .......... *G06T 3/4038* (2013.01); *H04N 5/23232* (2013.01); *G06T 7/0024* (2013.01); *G06T 2200/32* (2013.01); *G06T 2207/20221* (2013.01); *H04N 5/23238* (2013.01); *H04N 5/23293* (2013.01)

(58) Field of Classification Search
None
See application file for complete search history.

(56) References Cited

U.S. PATENT DOCUMENTS

| 6,714,689 | B1* | 3/2004 | Yano et al. | 382/284 |
| 2004/0189849 | A1* | 9/2004 | Hofer | 348/333.03 |
| 2005/0030597 | A1* | 2/2005 | Benham | 358/495 |
| 2007/0025723 | A1* | 2/2007 | Baudisch et al. | 396/287 |
| 2008/0253687 | A1* | 10/2008 | Zhang et al. | 382/284 |
| 2009/0066814 | A1 | 3/2009 | Miyata | |
| 2010/0239174 | A1* | 9/2010 | Oh et al. | 382/199 |
| 2012/0092522 | A1 | 4/2012 | Zhang et al. | |

FOREIGN PATENT DOCUMENTS

| JP | 2001-309228 | A | 11/2001 | |
| JP | 2001309228 | A | * 11/2001 | ............ H04N 5/225 |
| JP | 2008-219241 | A | 9/2008 | |
| JP | 2008-263538 | A | 10/2008 | |
| JP | 2009-065460 | A | 3/2009 | |

OTHER PUBLICATIONS

Japanese Office Action dated Mar. 5, 2013 (and English translation thereof) in counterpart Japanese Application No. 2011-198975.

* cited by examiner

*Primary Examiner* — Carlos Perromat  
*Assistant Examiner* — Xin Sheng  
(74) *Attorney, Agent, or Firm* — Holtz, Holtz, Goodman & Chick PC

(57) ABSTRACT

An image processing device, includes: an obtaining unit which successively obtains a plurality of images; a synthesis unit which partially superimposes the plurality of images obtained by the obtaining unit to generate a synthesis image when the obtaining unit obtains the images; a first judgment unit which judges whether the synthesis image contains a feature region having a predetermined feature when the synthesis image is generated by the synthesis unit; and a control unit which makes predetermined processing be executed when the first judgment unit judges that the synthesis image contains the feature region.

20 Claims, 14 Drawing Sheets

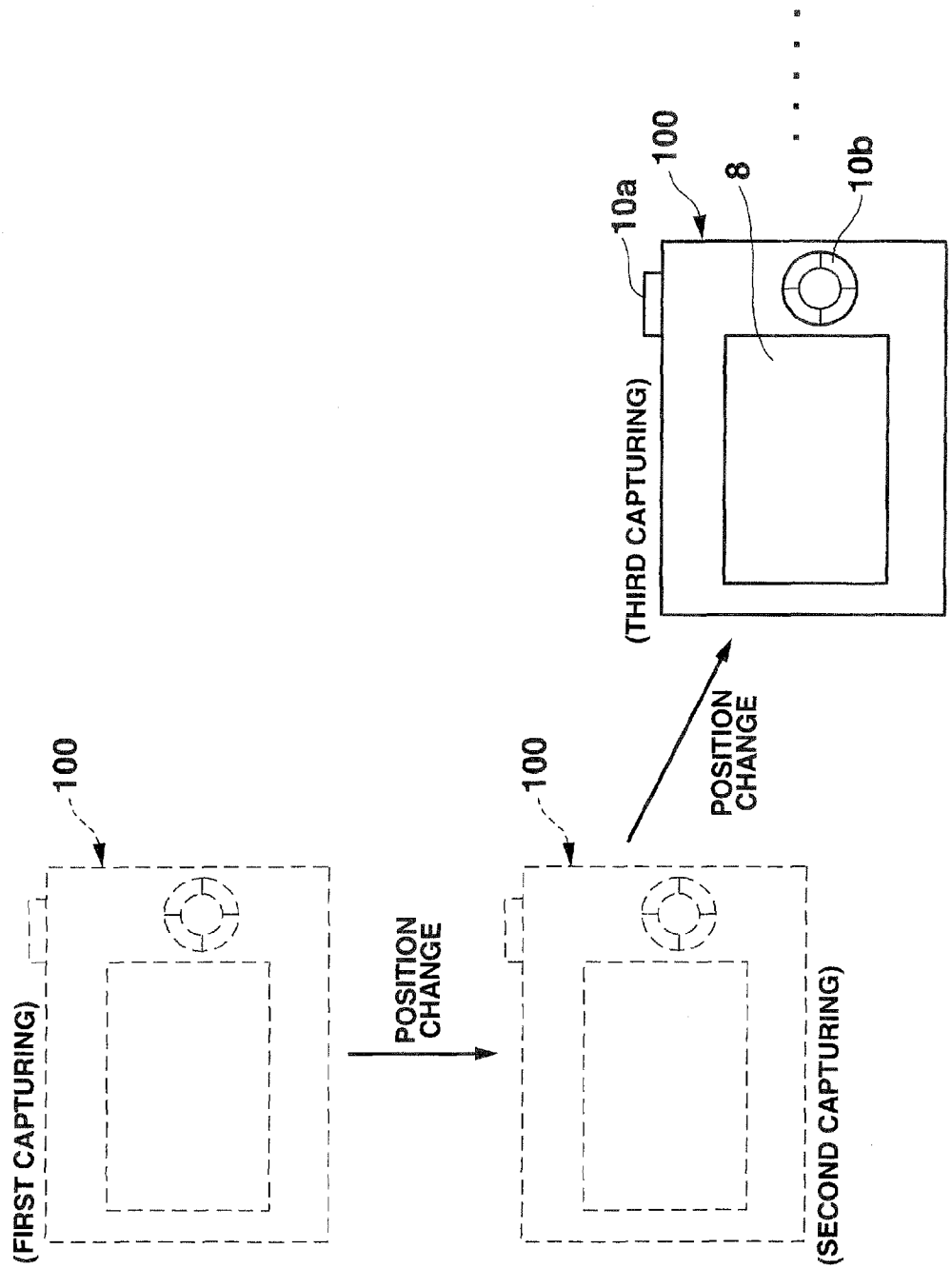

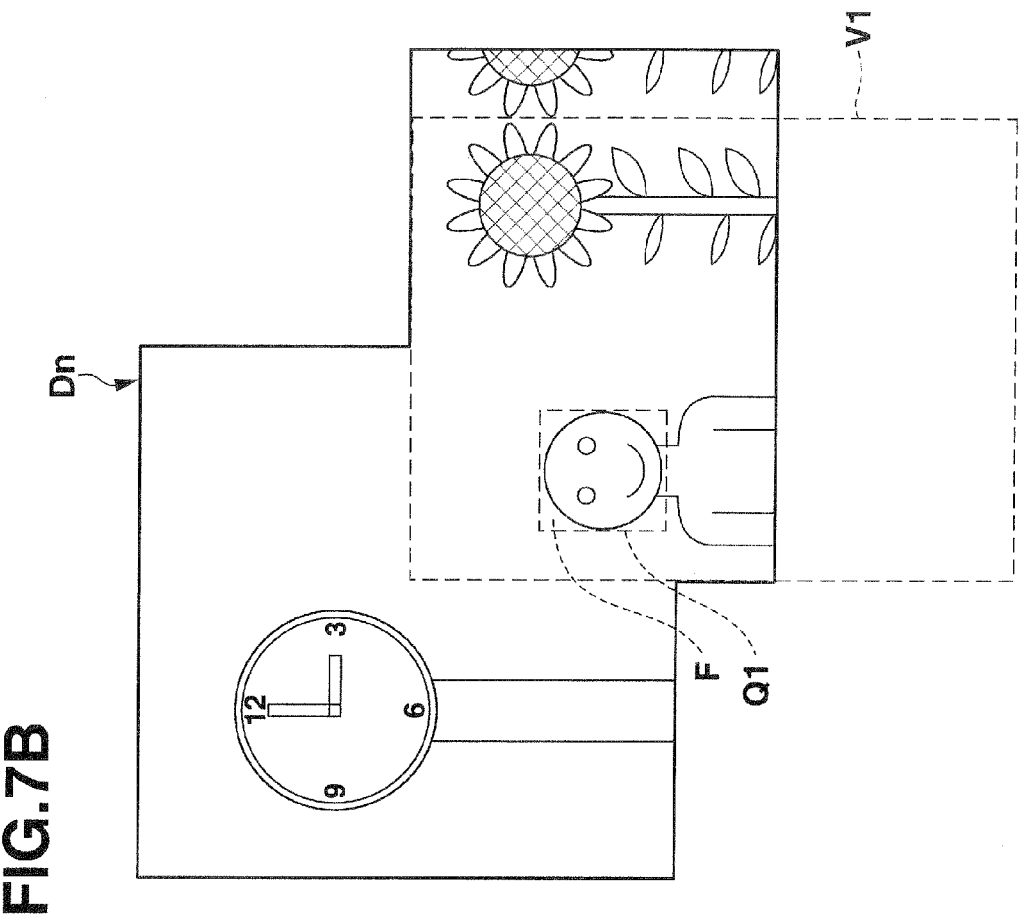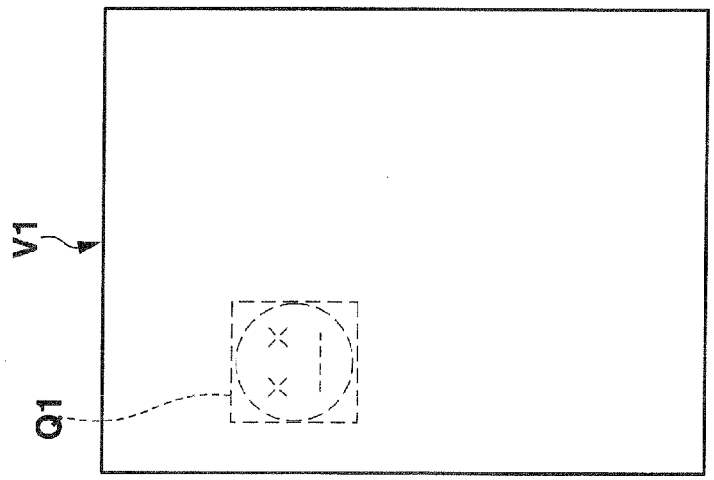

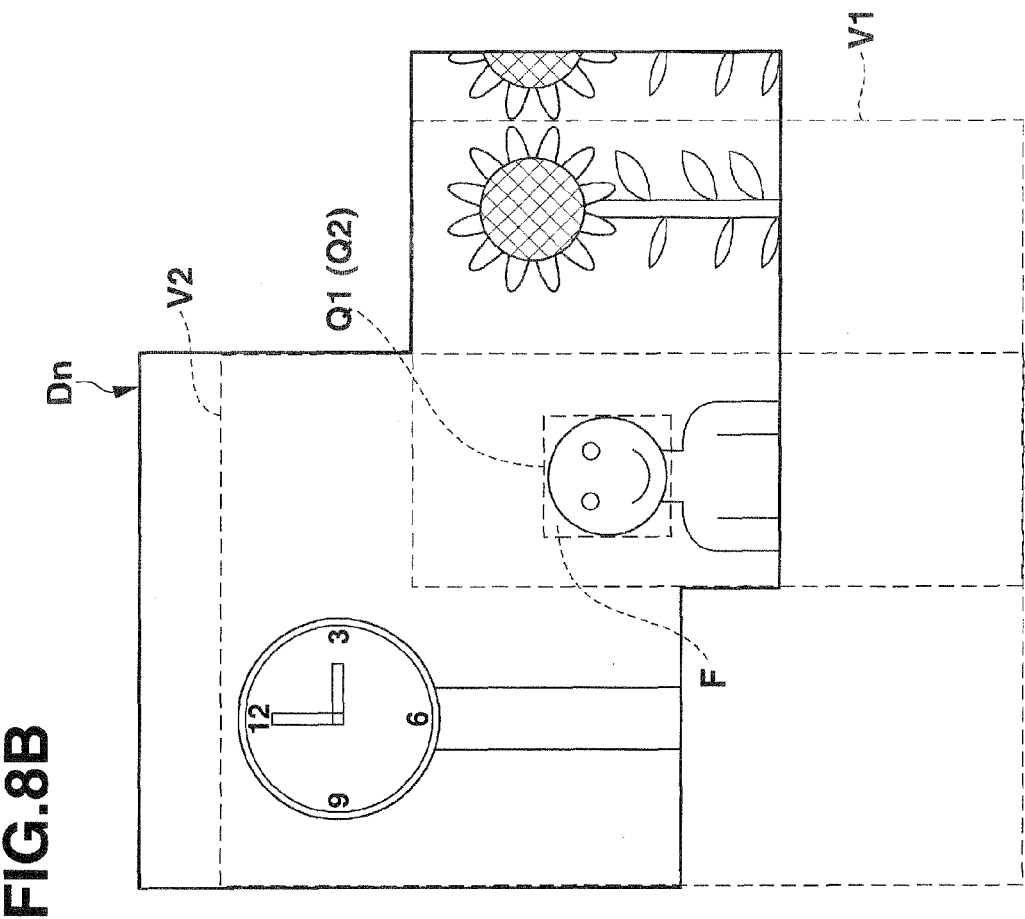
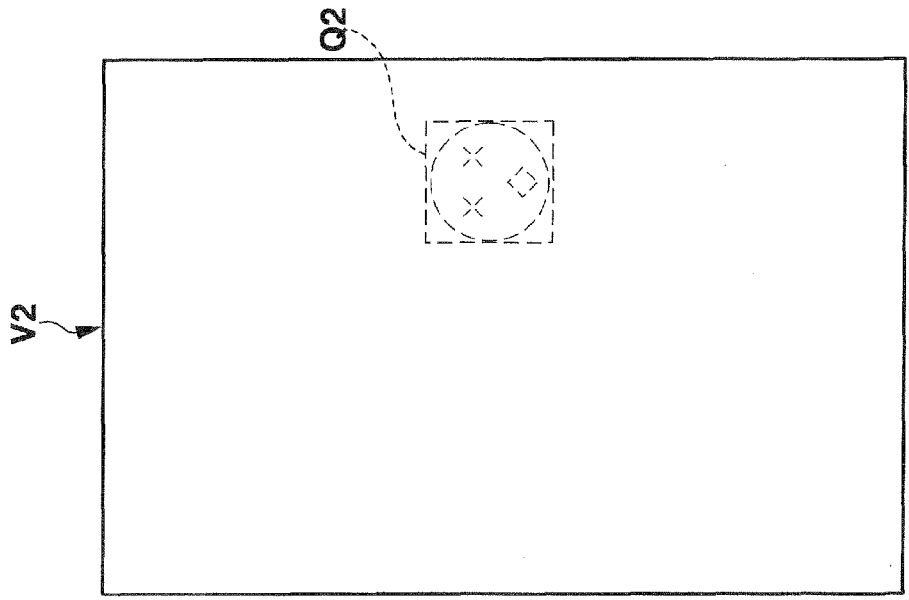

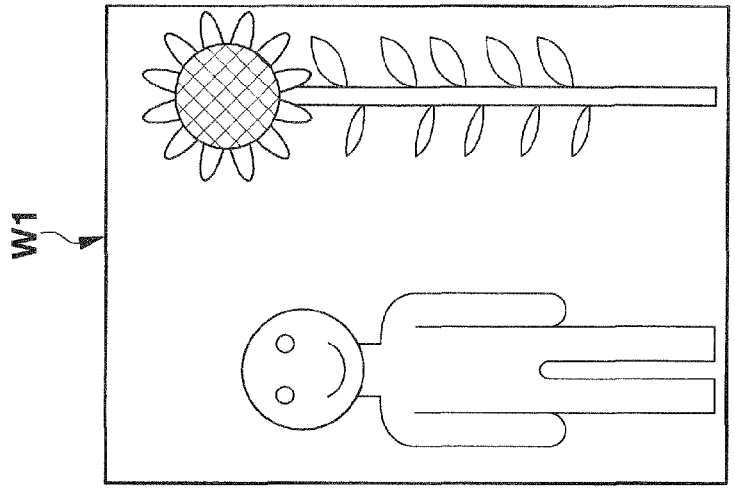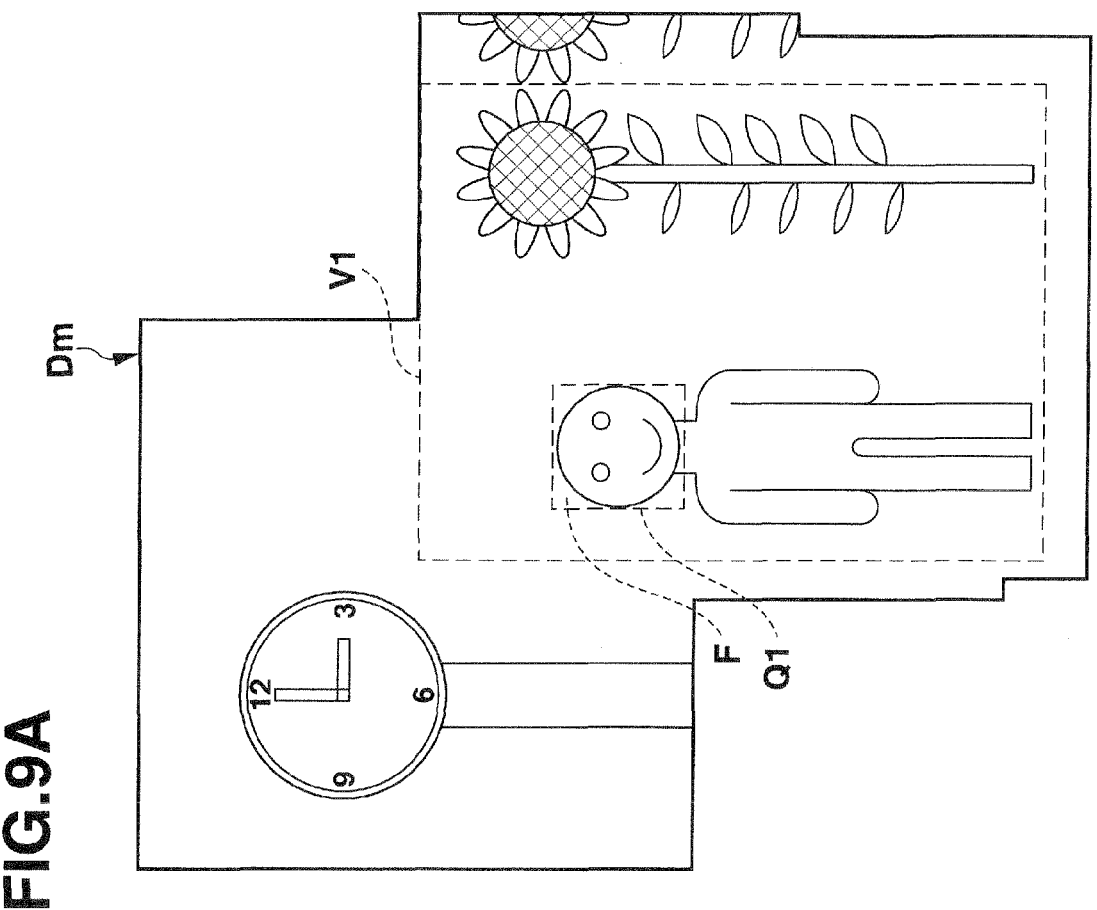

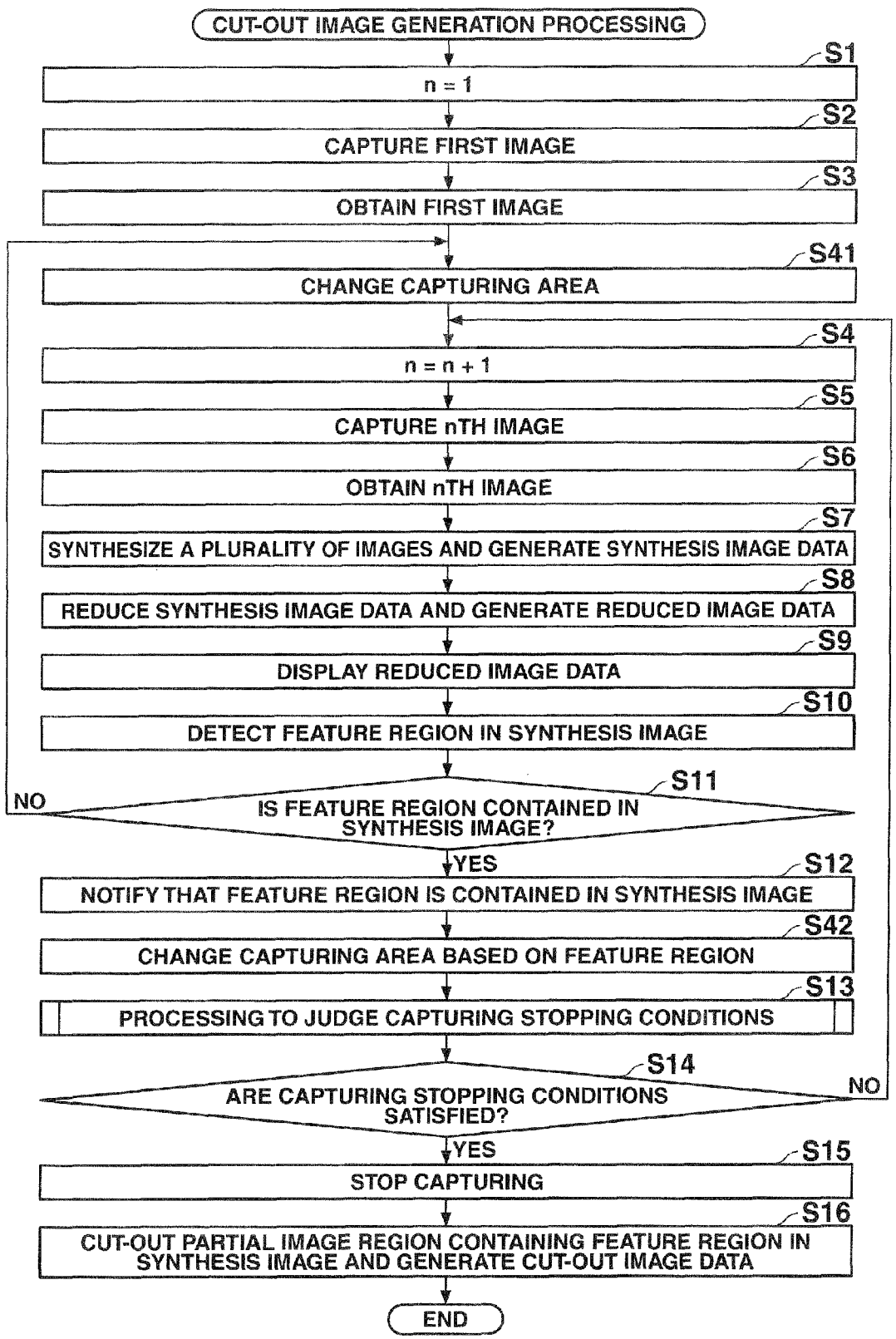

IMAGE PROCESSING DEVICE THAT SYNTHESIZES IMAGE

CROSS-REFERENCE TO RELATED APPLICATIONS

This application is based upon and claims the benefit of priority from the prior Japanese Patent Application No. 2011-198975, filed on Sep. 13, 2011, the entire contents of which are incorporated herein by reference.

BACKGROUND OF THE INVENTION

1. Field of the Invention

The present invention relates to an image processing device having a function of synthesizing captured images, an image processing method, and a recording medium for recording a program for image processing.

2, Description of Related Art

Conventionally, there have been technologies to generate a synthesis image (for example, a panoramic image) by superimposing partial regions of a plurality of images obtained by continuous capturing (for example, see the Japanese Unexamined Patent Application Publication No. 2009-65460).

However, in a case of cutting out a desired partial image region from a generated synthesis image, it is difficult to determine a final cut-out region of the synthesis image before images are captured. Therefore, synthesis of unnecessary image regions that are not in the cut-out image, and capture of images containing said unnecessary image regions are carried out wastefully.

It is desirable that a synthesis image can be generated more efficiently.

SUMMARY OF THE INVENTION

According to an aspect of the present invention, there is provided an image processing device, including:

an obtaining unit which successively obtains a plurality of images;

a synthesis unit which partially superimposes the plurality of images obtained by the obtaining unit to generate a synthesis image when the obtaining unit obtains the images;

a first judgment unit which judges whether the synthesis image contains a feature region having a predetermined feature when the synthesis image is generated by the synthesis unit; and a control unit which makes predetermined processing be executed when the first judgment unit judges that the synthesis image contains the feature region.

According to another aspect of the present invention, there is provided an image processing method by an image processing device, the method including:

successively obtaining a plurality of images;

partially superimposing the obtained plurality of images, to generate a synthesis image;

judging whether the synthesis image contains a feature region having a predetermined feature when the synthesis image is generated; and making predetermined processing be executed when the synthesis image is judged to contain the feature region.

According to still another aspect of the present invention, there is provided a non-transitory recording medium which records a program to make a computer of an image processing device to function as:

an obtaining unit which successively obtains a plurality of images;

a synthesis unit which partially superimposes the obtained plurality of images to generate a synthesis image;

a judgment unit which judges whether the synthesis image contains a feature region having a predetermined feature when the synthesis image is generated; and a control unit which makes predetermined processing be executed when the synthesis image is judged to contain the feature region.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 4 is a schematic view showing an example of capturing position change during continuous capturing;

FIGS. 7A and 7B are views showing an example of alignment between a position of a feature region in a synthesis image and a position of a feature region specified by a designated composition;

FIGS. 8A and 8B are views showing an example of alignment between a position of a feature region in a synthesis image and a position of a feature region specified by each of a plurality of designated compositions;

FIGS. 9A and 9B are views showing an example of cutting out of a part of an image region from a synthesis image;

FIG. 14 is a flowchart showing an example of a flow of cut-out image generation processing executed by the capturing device according to the second embodiment.

DETAILED DESCRIPTION OF THE PREFERRED EMBODIMENT

Specific embodiments of the present invention will be explained below with reference to the drawings. It should be noted, however, that the scope of the invention is not limited to the illustrated examples.

[First Embodiment]

A capturing device 100 according to a first embodiment successively obtains a plurality of images taken through continuous capturing, successively generates a synthesis image by superimposing and adding partial regions of the plurality of images obtained, judges whether the synthesis image contains a feature region which has a given feature, every time the synthesis image is generated successively, and performs image processing to notify that the feature region is contained in the synthesis image when it is judged that the synthesis image contains the feature region.

Figure 1:
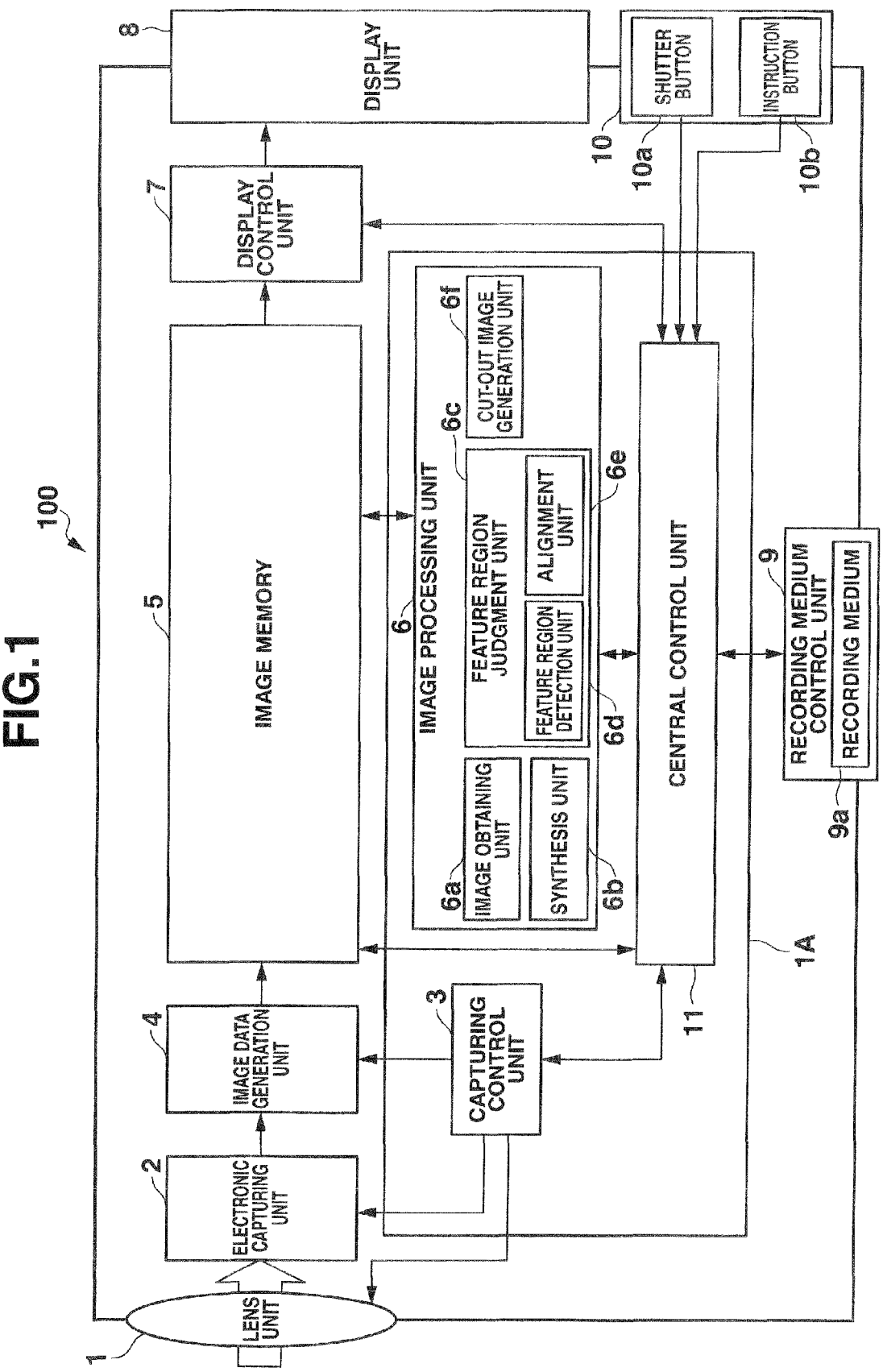
FIG. 1 is a block diagram showing a schematic configuration of a capturing device according to a first embodiment to which the present invention is applied.

FIG. 1 is a block diagram showing a schematic configuration of the capturing device 100 according to the first embodiment to which the present invention is applied.

As illustrated in FIG. 1, the capturing device 100 according to the first embodiment is provided with a lens unit 1, an electronic capturing unit 2, a capturing control unit 3, an image data generation unit 4, an image memory 5, an image processing unit 6, a display control unit 7, a display unit 8, a recording medium control unit 9, an operation input unit 10, and a central control unit 11.

Further, the capturing control unit 3, the image processing unit 6, and the central control unit 11 are designed as, for example, a custom LSI 1A.

The lens unit 11 includes a plurality of lenses such as a zoom lens and a focus lens.

Although not shown in the drawings, the lens unit 1 may also include a zoom driver which moves the zoom lens in an optical axis direction, and a focus driver which moves the focus lens in the optical axis direction, when an image of a subject is captured.

The electronic capturing unit 2 includes an image sensor such as a charge coupled device (CCD) and a complementary metal-oxide semiconductor (CMOS), and converts an optical image which has passed through various lenses of the lens unit 1 into a two-dimensional image signal.

The capturing control unit 3 includes a timing generator, a driver, and so on of which illustrations are omitted. The capturing control unit 3 drives the electronic capturing unit 2 to scan by using the timing generator and the driver, and causes the electronic capturing unit 2 to convert an optical image into a two-dimensional image signal in a given cycle, read out an image frame for each screen from a capturing region of the electronic capturing unit 2 and output the image frames successively to the image data generation unit 4.

The capturing control unit 3 also controls adjustments of capturing conditions for a main subject, such as auto focus (AF), auto exposure (AE), and auto white balance (AWB).

The image data generation unit 4 carries out gain control as necessary for respective color components of RGB with respect to an analog signal of an image frame transferred from the electronic capturing unit 2. Then, after sampling and holding the analog signal using a sample-hold circuit (not illustrated) and converting the same into digital data, the image data generation unit 4 carries out color processing including pixel interpolation and gamma control using a color processing circuit (not illustrated), and generates a luminance signal Y and color difference signals Cb and Cr (YUV data) in digital values as image data.

The image data outputted from the color processing circuit is DMA transferred by a non-illustrated DMA controller to the image memory 5 which is used as a buffer memory. As shown in FIG. 4, the capturing device 100 according to this embodiment is a capturing device which is able to perform continuous capture of a plurality of images which are regarded as different images respectively as a user changes orientation and position of image capture conducted by the capturing device 100. During the continuous image capture, the capturing control unit 3 causes the electronic capturing unit 2 to sequentially read out an image frame for each screen from a capturing region of the electronic capturing unit 2 and output the same to the image data generation unit 4 one after another, and the image data generation unit 4 successively generates image data.

The image memory 5 includes, for example, a DRAM, and temporarily stores image data which is transferred from the image data generation unit 4. The image memory 5 also temporarily stores data processed by the image processing unit 6 and the central control unit 11.

The image processing unit 6 is provided with an image obtaining unit 6a, a synthesis unit 6b, a feature region judgment unit 6c, and a cut-out image generation unit 6f.

The image obtaining unit 6a functions as obtaining unit which successively obtains a plurality of images captured continuously.

More specifically, the image obtaining unit 6a successively reads out and obtains image data which, for example, has been captured through collaboration of the lens unit 1, the electronic capturing unit 2 and the capturing control unit 3, generated by the image data generation unit 4, and stored in the image memory 5.

In this embodiment, the image obtaining unit 6a reads and obtains new image data every time the new image data is generated by the image data generation unit 4 and stored in the image memory 5, which, however, is only an example and the present invention is not limited thereto. For instance, the image obtaining unit 6a may check whether there is any image data in the image memory 5 which has not been obtained every time a certain period of time elapses, and, if there is image data which has not been obtained, the image obtaining unit 6a may obtain the data. The synthesis unit 6b functions as synthesis unit which synthesizes a plurality of images obtained by the image obtaining unit 6a (for example, images P1, Pn, and Pn+1 shown in FIGS. 5A and 5B) by superimposing and adding partial regions of these images and successively generates a synthesis image (for example, a synthesis image Dn in FIG. 5B).

Specifically, the synthesis unit 6b executes, for example, block matching processing in order to align image regions of a plurality of pieces of image data obtained by the image obtaining unit 6a, In this case, the synthesis unit 6b seeks a position (or a corresponding region) where a pixel value contained in one of the image regions of the plurality of pieces of image data optimally matches a pixel value in an image region of other image data. Then, the synthesis unit 6b superimposes and adds the corresponding regions to one another which showed the best evaluation value of pixel value difference (for example, a sum of squared difference (SSD) or a sum of absolute difference (SAD)) and generates a synthesis image. Also, the synthesis unit 6b outputs the generated synthesis image to the image memory 5. The synthesis image Dn is an image in which the overlapped parts of the image regions of the plurality of pieces of image data obtained by the image obtaining unit 6a are united as one piece of image data, and the non-overlapped parts of the same become an image containing an image region created by adding all the image regions of the plurality of pieces of image data. In other words, every time the synthesis image Dn is synthesized with an image which contains image regions overlapping and not overlapping the image region of the synthesis image Dn, the non-overlapping image region is added to the synthesis image Dn.

In this embodiment, the synthesis unit 6b successively generates synthesis image data whenever image data is obtained by the image obtaining unit 6a, which, however, is only an example and the present invention is not limited thereto. For example, the image obtaining unit 6a may check whether there is any new image data obtained by the image obtaining unit 6a every time a certain period of time elapses, and, if there is any new image data obtained, the synthesis unit 6b may generate synthesis image data using the image data.

Further, the synthesis unit 6b outputs sequentially-generated synthesis image data to the image memory 5 one after another. In short, the synthesis unit 6b successively updates synthesis image data stored in the image memory 5.

Figure 5A:
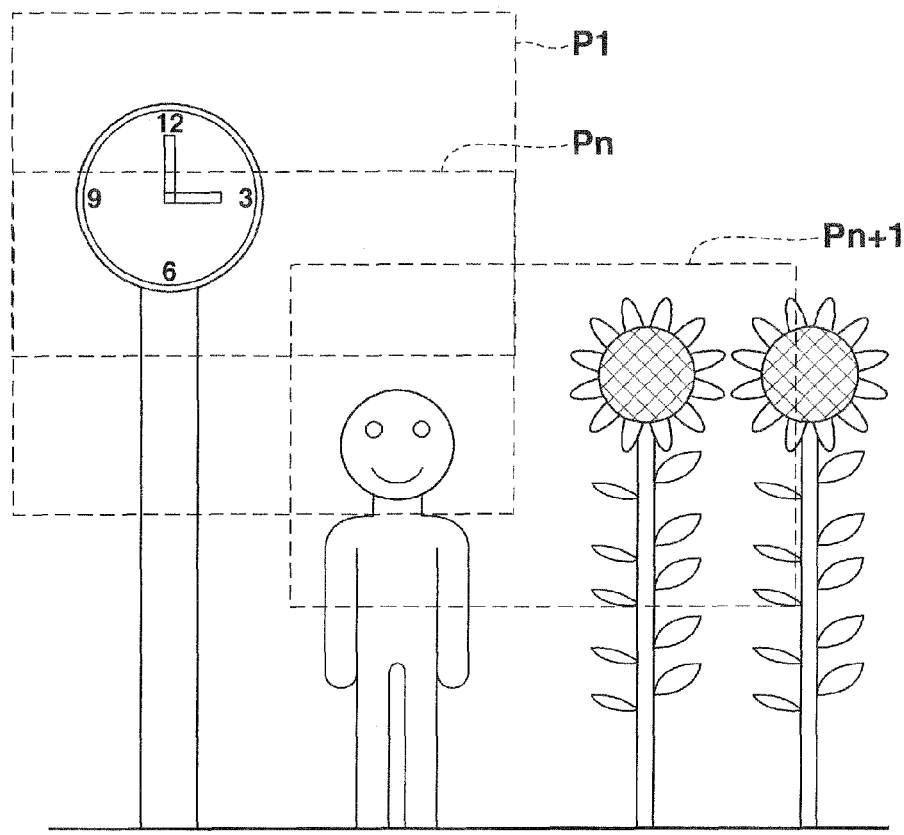
FIGS. 5A and 5B are views showing an example of a synthesis image generated by superimposing and adding partial regions of a plurality of images to each other.
Figure 5B:
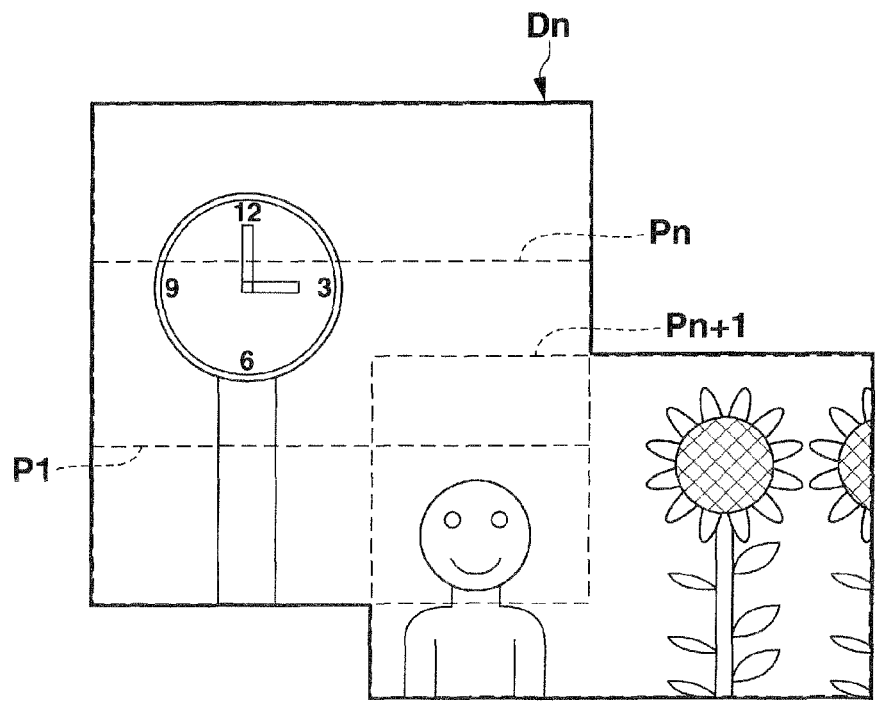

FIG. 5B illustrates an example where the three images P1, Pn, and Pn+1 obtained through continuous capturing of subjects shown in FIG. 5A are synthesized, however, the same applies to synthesis of two images or four or more images. Also, in a case where the image obtaining unit 6a obtains new image data after synthesis image data is generated, the synthesis unit 6b synthesizes the new image data into the synthesis image data which has been already generated, and outputs the new synthesis image data to the image memory 5. Further, the synthesis unit 6b may omit synthesis of new image data when the whole image region of the new image data is already contained in the image region of the synthesis image data which has been already generated.

Yet further, as synthesis image data is generated, the synthesis unit 6b reduces the image region of the generated synthesis image data by a given scale factor in horizontal and vertical directions, successively generates the reduced image data with a low resolution for display, and has the image memory 5 store the reduced image data.

The synthesis unit 6b may generate a synthesis image after performing various types of image processing on a non-synthesis image or a synthesis image. For example, in a case where corresponding regions of a plurality of non-synthesized images are captured in different zoom scales, the synthesis unit 6b may equalize the size of the corresponding regions of the plurality of images by conducting reducing or magnifying processing to change a part of or entire zoom scale of the plurality of images. When a synthesis image has a distortion because a plurality of images were obtained in different capturing conditions such as capturing angles, the synthesis unit 6b may also correct such a distortion before or after the image is synthesized.

The feature region judgment unit 6c includes a feature region detection unit 6d.

Figure 6:
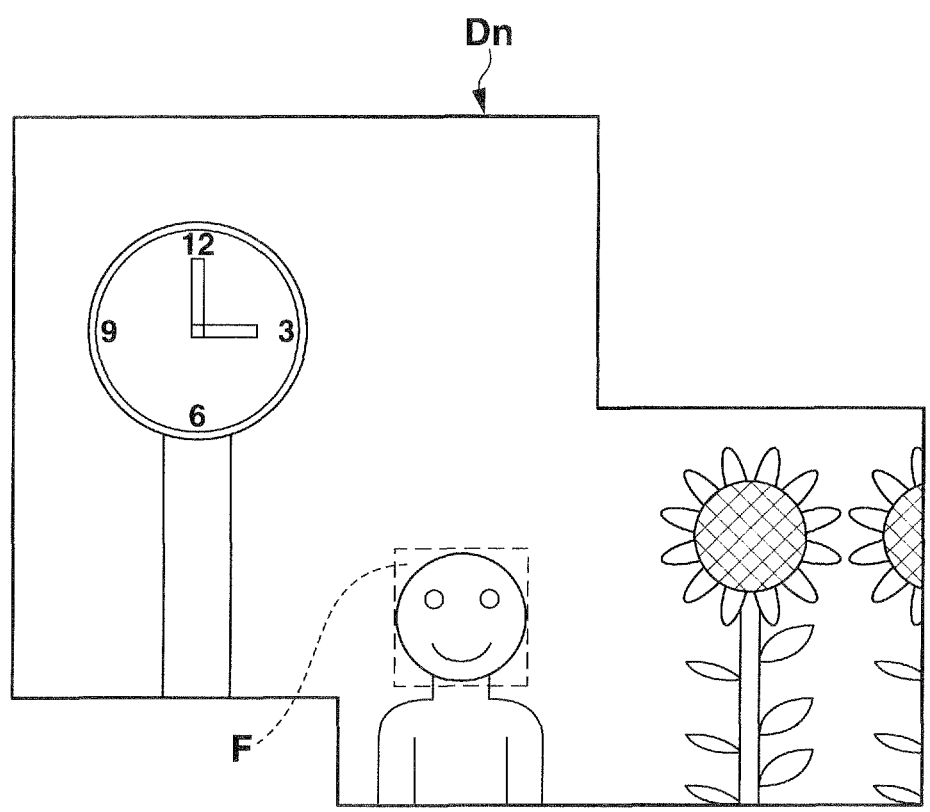
FIG. 6 is a view showing an example of detection of a feature region which contains a face region.

The feature region detection unit 6d stores feature point data which is used to recognize a human face in an image region, and performs feature region detection processing to detect feature points which correspond to a face region in a synthesis image Dn based on the feature point data. In such a case, for example, when the synthesis image Dn contains an image region with a certain level or higher level of similarity to the feature point data, the feature region judgment unit 6c detects the image region as a feature region F, as illustrated in FIG. 6. The feature region judgment unit 6c functions as a judgment unit which judges whether a synthesis image contains a feature region having a predetermined feature, every time the synthesis image is successively generated by the synthesis unit 6b.

To be more specific, as illustrated in FIG. 6, for example, in a case where the feature region F is detected by the feature region detection unit 6d in the synthesis image Dn, the feature region judgment unit 6c judges that a feature region is contained in a synthesis image. Meanwhile, in a case where an image region having a certain level or higher level of similarity to feature point data is not included in a synthesis image and a feature region is not detected by the feature region detection unit 6d, the feature region judgment unit 6c judges that a feature region is not included in a synthesis image. It should be noted that recognizing a face region as a feature region is an example only, and the feature region is not limited thereto. For instance, the feature region may be an image region which corresponds to an image of not only a human face area but also other body area of a human being, such as an upper half of a human body including a face region and an area of a whole human body. The feature region may also be an image region corresponding to a shape of buildings such as towers, and an image region corresponding to a certain geological form (for example, mountains). Further, the feature region judgment unit 6c may detect a plurality of feature regions from a synthesis image.

The feature region may also be a specific object (such as a certain type of human face or body shape, a certain article, and landmarks). In this case, the feature point data is data with which such specific object can be specified. The feature region judgment unit 6c is also provided with an alignment unit 6e.

In a case where it is judged by the feature region judgment unit 6c that a feature region is included in a synthesis image and a composition is designated, the alignment unit 6e aligns the position of the feature region detected in the synthesis image to the position of a feature region in the designated composition.

For example, when a composition designated through the operation input unit 10 (for example, a composition V1 shown in FIG. 7A) is such a composition that defines a position of a feature region in a cut-out region (for example, a position Q1 shown in FIG. 7A) from a synthesis image (for example, a synthesis image Dn shown in FIG. 7B), the alignment unit 6e calculates coordinates of pixels contained in the feature region (for example, a feature region F shown in FIG. 7B) in the image region of synthesis image data based on the position of the feature region contained in the image region of the synthesis image data, and carries out processing to align the calculated coordinates to the coordinates which indicate the position Q1 of the feature region in the image region to be cut out (cut-out region) defined by the composition. In other words, in the case of example illustrated in FIGS. 7A and 7B, the alignment unit 6e conducts alignment processing in order to identify relative positions of the cut-out region and the synthesis image Dn, in the case where the feature region F in the synthesis image Dn is located at the position Q1, based on the coordinates.

Also, when a plurality of compositions are designated, the alignment unit 6e performs alignment processing with respect to each of the compositions (for example, the composition V1 shown in FIG. 7A and a composition V2 shown in FIG. 8A).

For example, the composition V1 illustrated in FIG. 7A has a vertically-long rectangular cut-out region and specifies the position Q1 of the feature region in an upper part of the cut-out region to the left. The composition V2 illustrated in FIG. 8A has a vertically-long rectangular shape with a cut-out region larger than that of the composition V1, and specifies a position Q2 of a feature region near the center of the cut-out region to the right. Like an example shown in FIG. 8B, when these compositions V1 and V2 are designated, the alignment unit 6e aligns the feature region F in the synthesis image Dn to the positions Q1 and Q2 of the feature regions respectively specified by the compositions V1 and V2.

In a case where a composition is designated in which a position of a feature region in a cut-out region is specified by the cut-out image generation unit 6f from a synthesis image, the feature region judgment unit 6c may judge whether the synthesis image contains an image region which has a feature region at the position specified by the designated composition, every time a synthesis image is sequentially generated by the synthesis unit 6b.

For example, when the composition V1 shown in FIG. 7A is designated through the operation input unit 10, the feature region judgment unit 6c may have the alignment unit 6e identify relative positions of a cut-out region and the synthesis image Dn in a case where the feature region F in the synthesis image Dn is located at the position Q1 as shown in FIG. 7B, every time synthesis image data is generated by the synthesis unit 6b successively. Then, based on the relative positions identified, the feature region judgment unit 6c may judge whether synthesis image data is generated in which the feature region F is contained at the position Q1 specified by the designated composition V1 and the synthesis image data containing an image region corresponding to the entire cut-out region. That is, in a case where an image region contains a feature region, and the feature region contained in the image region of synthesis image data is located at a position of a feature region specified in a cut-out region in accordance with a designated composition, the feature region judgment unit 6c may judge whether synthesis image data which contains an image region corresponding to the entire region of the partial image region (hereinafter referred to as a complete synthesis image data) has been generated.

Capturing may be stopped when the feature region judgment unit 6c judges that a synthesis image contains an image region in a composition having a feature region.

To be specific, for example, when it is judged by the feature region judgment unit 6c that complete synthesis image data has been generated by the synthesis unit 6b with respect to a designated composition, the capturing control unit 3 may cause the electronic capturing unit 2 to stop conversion of an optical image into an image signal. At the same time, the capturing control unit 3 may cause the electronic capturing unit 2 to stop the processing of reading out an image frame for each screen from the capturing region thereof and output the same to the image data generation unit 4. Here, the capturing control unit functions as a stopping unit which stops image capturing executed by a capturing unit.

In a case where a plurality of compositions are designated, the feature region judgment unit 6c may judge, with respect to the each of the compositions, whether a synthesis image that is successively generated by the synthesis unit 6b contains an image region which has a feature region at a position specified by each of the compositions.

For instance, in a case where the composition V1 illustrated in FIG. 7A and the composition V2 illustrated in FIG. 8A are designated via the operation input unit 10, the feature region judgment unit 6c may judge, with respect to each of the designated compositions V1 and V2, whether a synthesis image data (for example, the synthesis image Dn shown in FIG. 8B) which is successively generated by the synthesis unit 6b contains a feature region at the positions Q1 and Q2 of feature regions specified by the compositions V1 and V2, respectively. In other words, the feature region judgment unit 6c may judge whether complete synthesis image data which corresponds to all the plurality of designated compositions has been generated.

Further, with regard to any composition or a plurality of compositions designated, capturing may be stopped when it is judged that a synthesis image contains an image region in which a feature region exists at a position specified by the compositions.

The foregoing explanation with reference to FIG. 8B describes a case where the two compositions V1 and V2 are designated, however, the same applies to a case where three or more compositions are designated. When a plurality of compositions are designated, different feature regions may be specified by the respective compositions. Also, compositions are not limited to the examples illustrated in FIGS. 7A, 7B, 8A and 8B.

Compositions to be designated include, for example, a horizontal line composition, a vertical line composition, an inclined line composition, a diagonal line composition, a radial line composition, a curvilinear composition, an S-shaped composition, a triangle composition, an inverted triangle composition, a contrasting or symmetrical composition, a tunnel composition, a pattern composition, as well as other various types of compositions. The horizontal line composition is a composition in which a horizontal line or a line along the horizontal line is emphasized or suggested by a subject on the horizontal line in a cut-out region (for example, a border line between the horizon and sky). The vertical line composition is a composition in which a line in a direction orthogonal to the horizontal line is emphasized or suggested by a subject along the direction in a cut-out region. The inclined line composition is a composition in which a line in a vertical direction is emphasized or suggested by a subject along the lines in an inclined direction at approximately the same angle in the inclined direction in a cut-out region. The diagonal line composition is a composition in which the inclined line in the inclined line composition is used as a diagonal line of a cut-out region. The radial line composition is a composition which contains a subject which spreads out in a radial fashion from a single point or a partial region in a cut-out region. The curvilinear composition is a composition which includes a subject which curves or a plurality of subjects arranged to a curve in a cut-out region. The S-shaped composition is a composition which includes a subject which curves like an S shape or a plurality of subjects arranged in an S-shape curve in a cut-out region. The triangle composition is a composition which contains a subject in a triangle shape having one vertex on the sky side because an image of the subject is captured so that the base (or the earth) side thereof is relatively large and the upper (or the sky) side thereof is relatively small in a cut-out region. The inverted triangle composition is a composition which contains a subject in an inverted triangle shape having one vertex on the earth side since an image of the subject is captured so that the base (or the earth) side thereof is relatively small and the upper (or the sky) side thereof is relatively large in a cut-out region. The contrasting or symmetrical composition is a composition which contains two subjects or more which have or suggest a contrast or symmetric relation with each other along a given boundary which divides a cut-out region into two. The tunnel composition is a composition which contains a subject in which a point or a partial region is relatively bright, and a region which spreads out in a radial fashion from the point or the partial region is relatively dark in a cut-out region. The pattern composition is a composition in which an alignment of a plurality of subjects in a cut-out region forms a certain pattern.

The capturing device 100 stores composition data which corresponds to each of the compositions to be designated. The composition data may be stored, for example, in a non-illustrated storage device (for example, a flash memory) or in a recording medium 9a and the like provided in the capturing device 100.

Each of the composition data may also contain information that indicates various types of conditions for depiction of a cut-out region. The information indicating various conditions may include, for example, information on screen composition, area ratio, spatial composition, shape and location, bilateral symmetry, fractal dimension, color distribution, color redundancy, and hue, and may also include other information concerning a cut-out region. The information on screen composition indicates arrangement of a main subject in a cut-out region and a screen split ratio based on the main subject. The information on area ratio represents a ratio of an image region area occupied by a main subject in a cut-out region. The information on spatial composition indicates an area ratio of an image region occupied by a region other than the main subject (blank space), and so on. The information on shape and location shows a shape, a location, and the like of a main subject in a cut-out region. The information on bilateral symmetry represents symmetry of an area of each of main subjects when there is more than one main subject. The information on fractal dimension includes information on fractal dimension of one-dimensional line, relating to coarseness and fineness of a one-dimensional line (for example, an outline or the like between subjects or between a subject and other space) contained in a cut-out region and complexity of positional relationship among multiple lines. The information on fractal dimension also relates to information on fractal dimension of two-dimensional luminosity changes, which relates to changes of luminosity (brightness) of the entire cut-out region, as well as complexity of such changes. The information on color distribution represents color distribution in a cut-out region, a level of cohesion of respective distributed colors, and complexity of the distribution, and includes information regarding entropy of color distribution. The information on color redundancy is information concerning a level of redundancy of colors in a cut-out region. The hue information indicates the number of hues contained in a cut-out region. The feature region judgment unit 6c may obtain composition data of a designated composition and various conditions contained in the composition data, and judge whether a synthesis image which is successively generated by the synthesis unit 6b contains an image region which has a feature region at a position for a feature region specified by the various conditions contained in the composition data.

No composition may be designated. For example, the capturing device 100 may contain predetermined composition data.

The cut-out image generation unit 6f functions as a cut-out unit which cuts out a partial image region containing a feature region from a synthesis image generated by the synthesis unit 6b.

Specifically, for example, when it is judged by the feature region judgment unit 6c that a synthesis image contains an image region which has a feature region at a location specified by a designated composition, the cut-out image generation unit 6f cuts out a cut-out region from the complete synthesis image data in accordance with the designated composition. The cut-out image generation unit 6f outputs data which corresponds to the partial image region which has been cut out to the recording medium control unit 9 and has the recording medium 9a store the data as cut-out image data. In the case of an example illustrated in FIG. 9A, a synthesis image Dm which includes a feature region F contains the whole region of the cut-out region of the composition V1 in which a position of a feature region Q1 is specified. In this case, the feature region judgment unit 6c judges that the synthesis image contains an image region which has a feature region at a position specified by the designated composition. The cut-out image generation unit 6f cuts out the cut-out region of the composition V1 from the synthesis image Dm to generate a cut-out image W1.

When more than one composition is designated, the cut-out image generation unit 6f executes cut-out processing for each of the compositions, generates plural pieces of cut-out image data corresponding to the respective compositions, and output the same to the recording medium control unit 9.

When no composition is designated, the cut-out image generation unit 6f may generate cut-out image data based on given conditions. For example, the cut-out image generation unit 6f may generate cut-out image data by cutting out a cut-out region determined based on an instruction input made by a user through the operation input unit 10, or may generate cut-out image data by cutting out a rectangular-shaped image region in the maximum size, which contains a feature region in a synthesis image.

The timing for the cut-out image generation unit 6f to generate cut-out image data can be set arbitrarily. For example, the cut-out image generation unit 6f may generate cut-out image data when it is judged that an instruction for cutting out an image from a synthesis image is inputted through the operation input unit 10, or may automatically generate cut-out image data when it is judged by the feature region judgment unit 6c that complete synthesis image data has been generated according to a designated composition. The contents of the settings with regard to timing for generating a cut-out image may be determined depending on, for example, an instruction inputted through the operation input unit 10.

The display control unit 7 performs control to read out reduced image data stored in the image memory 5 and display a reduced image on the display unit 8.

To be more specific, the display control unit 7 includes a VRAM, a VRAM controller, a digital video encoder, and so on. The digital video encoder periodically reads out, through the VRAM controller, a brightness signal Y and color-difference signals Cb and Cr of reduced image data which has been read out from the image memory 5 and stored in the VRAM (not illustrated) under the control of the central control unit 11. The digital video encoder then generates video signals based on the data, and outputs the video signals to the display unit 8. The display control unit 7 also has a function of causing the display screen of the display unit 8 to display a live view image based on a plurality of image frames generated through image capture conducted by the electronic capturing unit 2 and the capturing control unit 3, a REC view image captured as a real captured image, a synthesis image from synthesis image data, and so on.

The display unit 8 is, for example, a liquid crystal display device, and functions as a display unit which displays a reduced image which corresponds to a synthesis image sequentially generated by the synthesis unit 6b, based on a video signal from the display control unit 7. The display unit 8 also displays a live view image, a REC view image, a synthesis image, and the like on the display screen based on a video signal from the display control unit 7.

When the feature region judgment unit 6c judges that a feature region is contained in a synthesis image, the display control unit 7 notifies that a feature region is contained in a synthesis image by displaying an image region detected as a feature region in the synthesis image on a reduced image displayed on the display unit 8 in an identifiable form of display.

Figure 10:
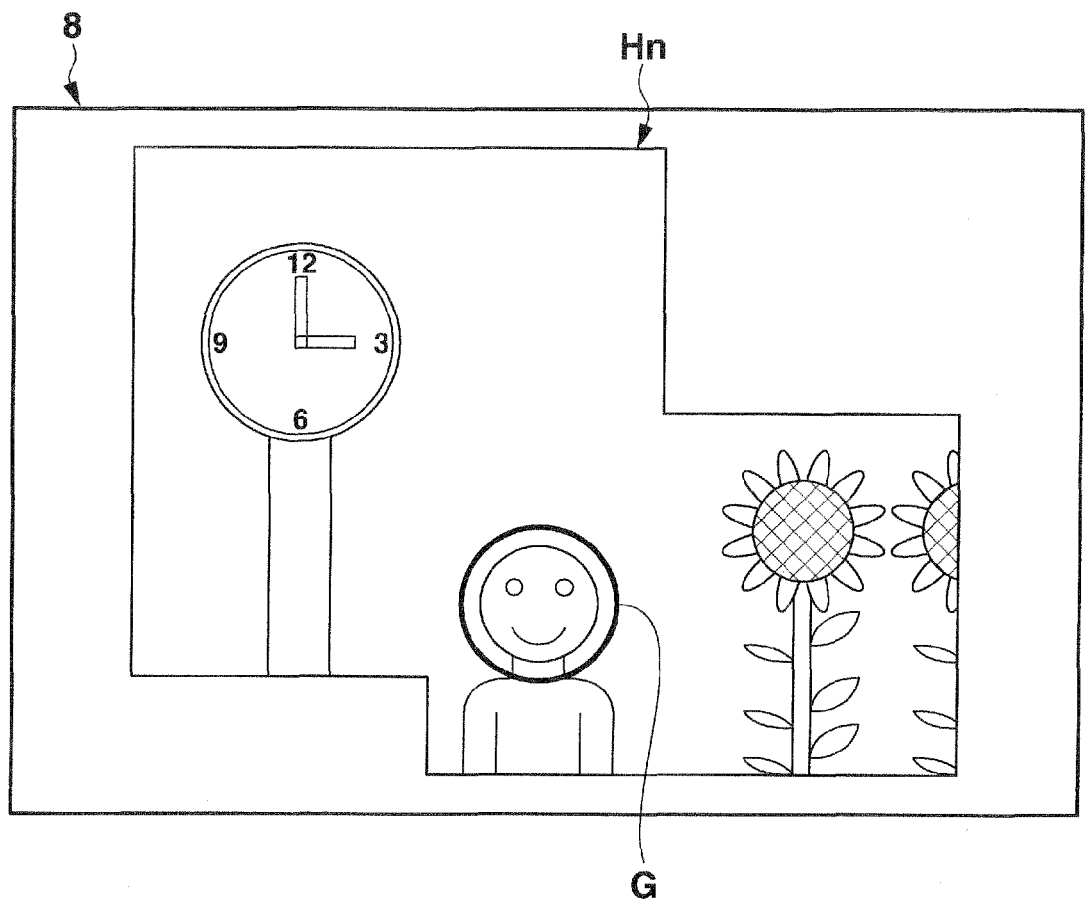
FIG. 10 is a view showing an example of notification that a feature region is included in a synthesis image.

More specifically, for example, as illustrated in FIG. 10, the display control unit 7 displays a reduced image Hn which corresponds to a synthesis image Dn on the display screen of the display unit 8, and also displays on the display screen of the display unit 8 an indicator G which surrounds a periphery of an image region of the reduced image Hn, the image region corresponding to a feature region F in the synthesis image Dn. This enables the display unit 8 to visually notify a user that a feature region is contained in the synthesis image Dn and that the image region surrounded by the indicator G is the feature region, thus attracting attention of a user to the fact that a feature region is contained in a synthesis image. A user, who has been notified that a feature region is contained in a synthesis image, carries out continuous capturing with reference to the feature region, which can prevent wasteful capturing of areas that are unrelated or not very relevant to the feature region.

Here, in a case where the feature region judgment unit 6c judges that a feature region is contained in a synthesis image, the display control unit 7 and the display unit 8 notify that a feature region is contained in a synthesis image. The display control unit 7 may also notify that a feature region is contained in a synthesis image when it is judged by the feature region judgment unit 6c that a synthesis image contains an image region having a feature region at a position specified by a designated composition.

Figure 11:
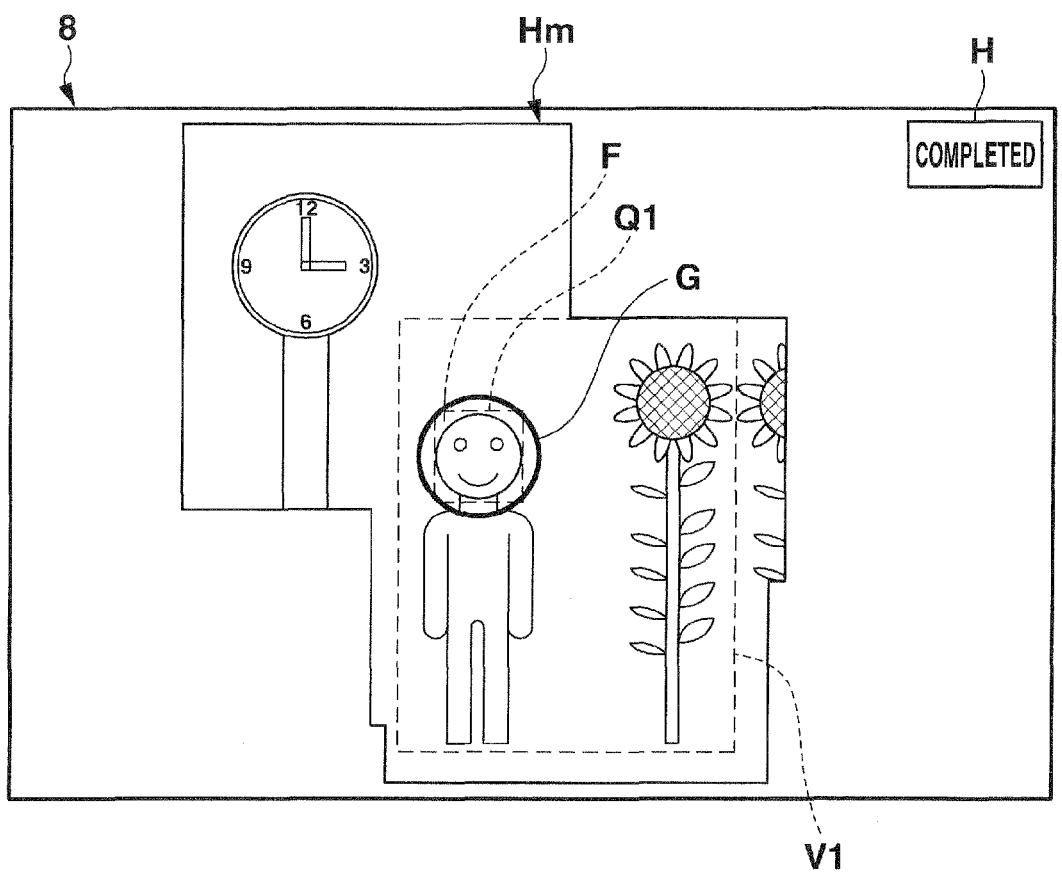
FIG. 11 is a view showing an example of notification when it is judged that a synthesis image contains an image region in which a feature region is present at a position specified by a designated composition.

A specific example is that, as illustrated in FIG. 11, when it is judged by the feature region judgment unit 6c that a synthesis image contains an image region having a feature region at a position specified by a designated composition because complete synthesis image data corresponding to a designated composition V1 has been generated, the display control unit 7 displays, on the display screen of the display unit 8, a reduced image Hm which corresponds to the complete synthesis image data, as well as the indicator G which surrounds the periphery of an image region of the reduced image Hm corresponding to the image region that is detected as a feature region. Also, the display control unit 7 displays on the display screen of the display unit 8 an indicator H indicating that generation of complete synthesis image data has been completed. As just described, the display control unit 7 and the display unit 8 may notify a user that a feature region is contained in an image region of the complete synthesis image data, an image region surrounded by the indicator G is a feature region, and that image capture corresponding to a designated composition has been completed.

Further, when it is judged by the feature region judgment unit 6c, for all of a plurality of compositions, that a synthesis image contains an image region having a feature region at a position specified by each of the compositions designated, the display control unit 7 may notify that the feature region is contained in the synthesis image.

Figure 12:
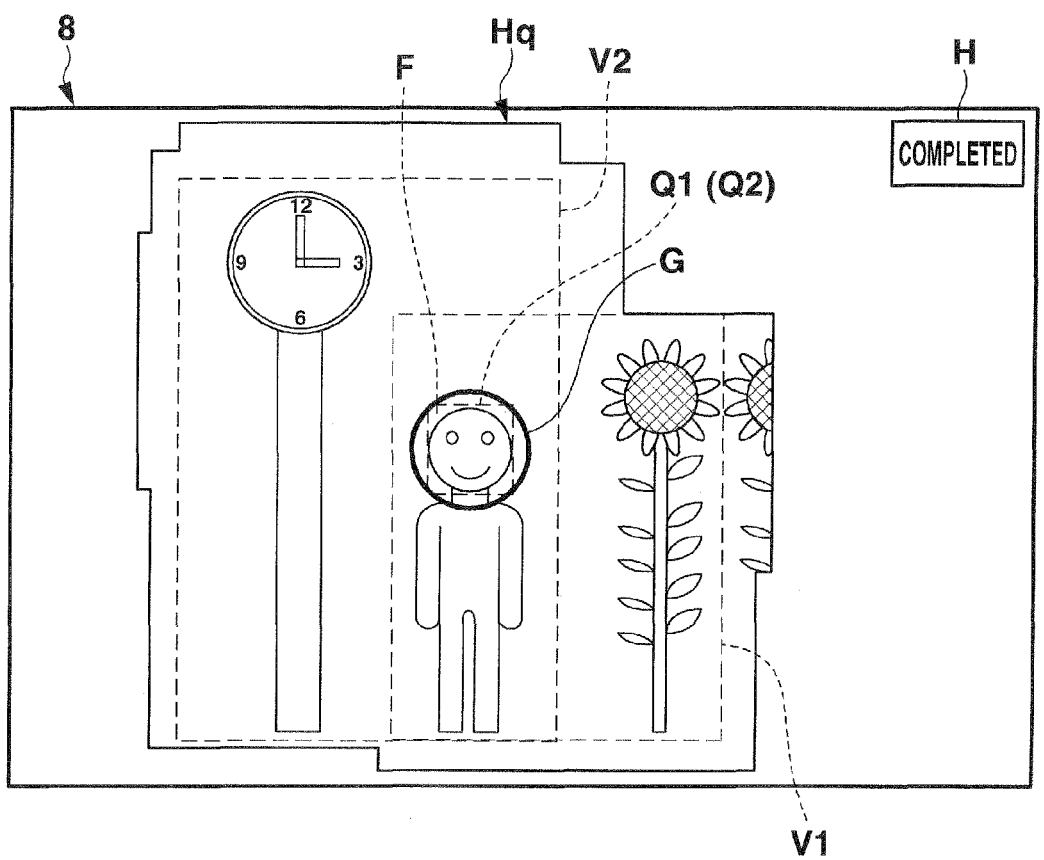
FIG. 12 is a view showing an example of notification when it is judged that a synthesis image contains an image region in which a feature region is present at a position that is respectively specified by all of a plurality of designated compositions.

Specifically, for example, as shown in FIG. 12, when it is judged by the feature region judgment unit 6c that a synthesis image contains an image region having a feature region at a position specified by a plurality of designated compositions V1 and V2 because complete image data is generated corresponding to all the compositions, the display control unit 7 displays, on the display screen of the display unit 8, a reduced image Hq which corresponds to the complete synthesis image data, and an indicator G which surrounds the periphery of an image region of the reduced image Hq, the image region corresponding to an image region detected as a feature region. Also, the display control unit 7 displays on the display screen of the display unit 8 an indicator H indicating that generation of complete synthesis image data has been completed. As just described, the display control unit 7 and the display unit 8 may notify a user that a feature region is contained in an image region of the complete synthesis image data, an image region surround by the indicator G is a feature region, and image capture based on all the designated compositions has been completed.

Display of the notification that a feature region is contained in a synthesis image by using the display unit 8 was explained as an example form of notification. However, this is only an example, and the notification form is not limited thereto and may be arbitrarily changed as necessary. For example, the notification may be displayed by painting a feature region with a given color, or the outline of a feature region may be displayed in an identifiable manner. When displaying the outline of a feature region, the outline may be closed so as to cover the feature region or may be opened. As an exemplary case where the notification is given by showing an opened outline of a feature region includes a case where a synthesis image does not contain the whole feature region.

Any form may be applied to notification that a feature region is contained in a synthesis image as long as the notification form can make a user understand and recognize a feature region through five senses, particularly visual, hearing, and touching senses. For example, presence of a feature region may be notified by sound (for example, voice), vibration and so on.

The recording medium control unit 9 has the recording medium 9a in an attachable/detachable fashion, and controls reading of data from the recording medium 9a attached and writing of the data in the recording medium 9a,In other words, the recording medium control unit 9 causes the recording medium 9a to store recording image data coded by a JPEG compression unit (not illustrated) of the image processing unit 6. The recording image data includes cut-out image data.

The recording medium 9a includes, but not limited to, a non-volatile memory (flash memory) which can be arbitrarily changed as appropriate.

The operation input unit 10 is used to perform given operations of the capturing device 100. Specifically, the operation input unit 10 is provided with a shutter button 10a related to an instruction of an image capture of a subject, an instruction button 10b related to selection of capturing modes, functions and so on, and instruction of a composition on a menu screen, a zoom button (not illustrated) related to an instruction of zoom adjustment, and so on. The operation input unit 10 outputs given operation signals to the central control unit 11 depending on operations of these buttons.

Here, the operation input unit 10 functions as a designation unit which designates at least one composition in which a position of a feature region in a cut-out region is specified by the cut-out generation unit 6f.

The operation input unit 10 also functions as a unit to input instructions related to various settings. The various settings that are made via the operation input unit 10 include, for example, settings concerning timing to generate cut-out image data, and settings concerning conditions to stop continuous capturing (capturing stopping conditions). Examples of the settings for the capturing stopping conditions include a setting to stop capturing when it is judged that a synthesis image contains an image region having a feature region at a position specified by a designated composition (or respective compositions when a plurality of compositions is designated), or a setting to stop capturing when a user inputs an instruction to stop capturing through the operation input unit 10.

In a case where no composition is designated, the capturing control unit 3 follows an instruction to stop capturing inputted through the operation input unit 10, however, may also stop capturing in accordance with an instruction input through the operation input unit 10 when a composition is designated.

The central control unit 11 controls each unit of the capturing device 100. Specifically, the central control unit 11 is provided with a CPU, a RAM, and a ROM (none of them are illustrated), and executes various control operations according to various processing programs (not illustrated) for the capturing device 100.

Figure 2:
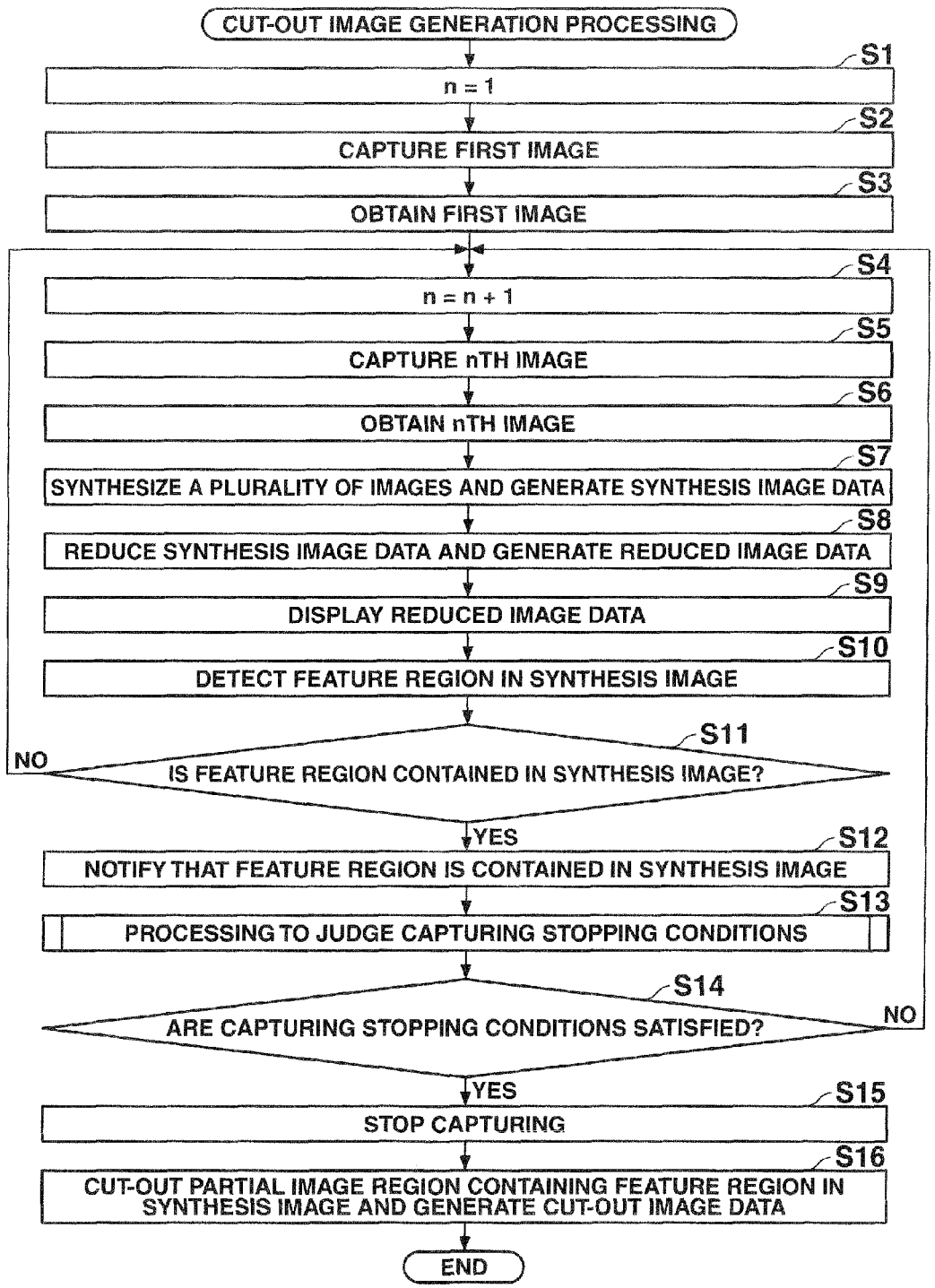
FIG. 2 is a flowchart showing an example of a flow of cut-out image generation processing.
Figure 3:
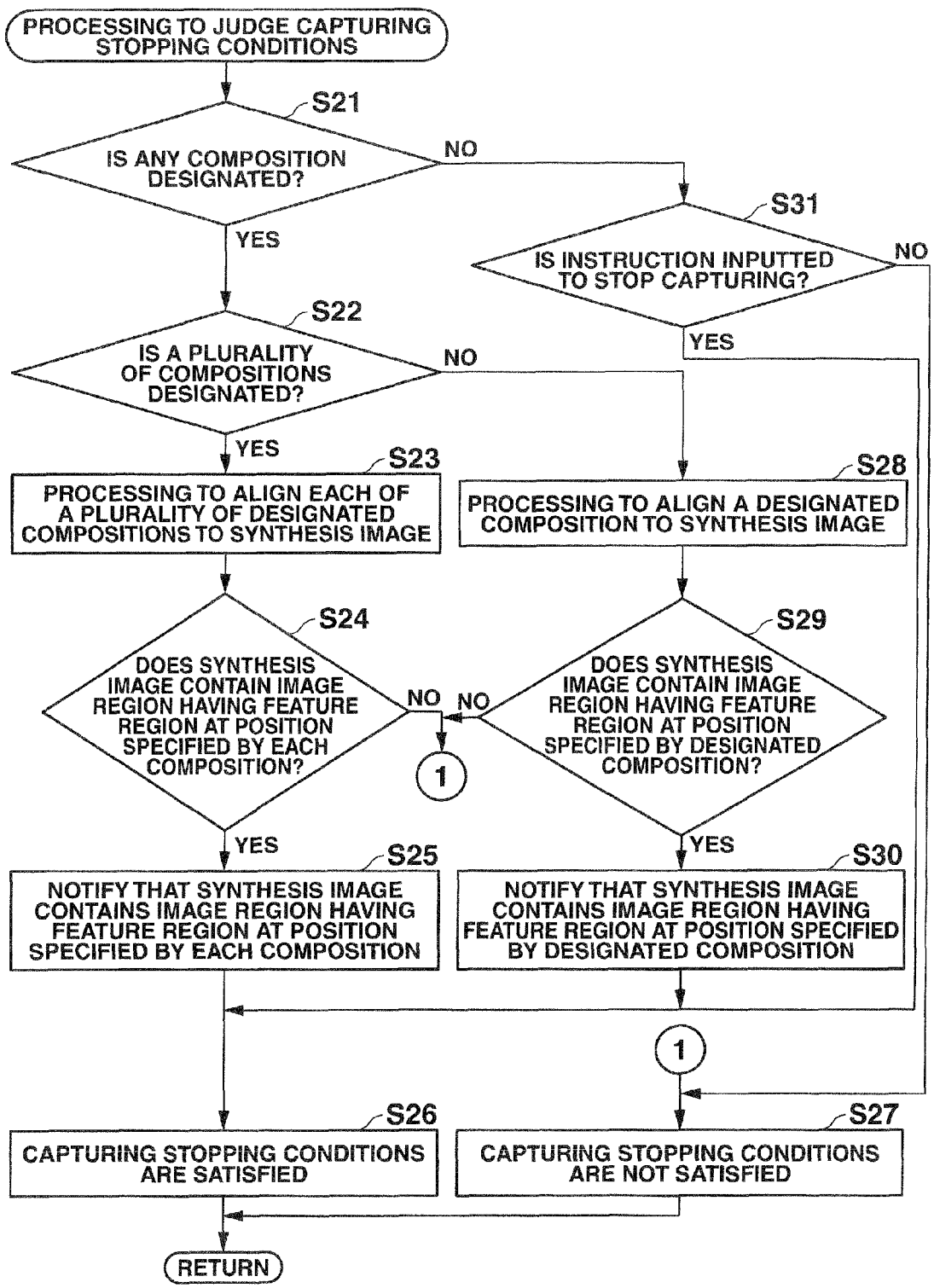
FIG. 3 is a flowchart showing an example of a flow of capturing stopping condition judgment processing.

Next, cut-out image generation processing executed by the capturing device 100 will be explained with reference to the flowcharts shown in FIGS. 2 and 3.

First, the image obtaining unit 6a sets a counter n for counting the number of images obtained to a default value 1 (step S1). Then, the first image is captured through collaboration among the lens unit 1, the electronic capturing unit 2, the capturing control unit 3 and so on (step S2). To be specific, the electronic capturing unit 2 converts an optical image which has passed through the various lenses of the lens unit 2 into a two-dimensional image signal, the capturing control unit 3 has the electronic capturing unit 2 read an image frame for each screen from a capturing region thereof and output the image frame to the image data generation unit 4, and the image data generation unit 4 successively generates image data from the image frame and successively stores the same in the image memory 5.

Then, the image obtaining unit 6a reads out the image data stored in the image memory 5 and obtains the first image (step S3). The image processing unit 6 adds 1 to the value of the counter n (step S4).

Thereafter, similarly to capturing of the first image, the nth image is captured through collaboration among the lens unit 1, the electronic capturing unit 2, the capturing control unit 3 and so on (step S5). Then, the image processing unit 6 reads out the image data stored in the image memory 5 and obtains the nth image (step S6).

Next, the synthesis unit 6b generates synthesis image data by synthesizing a plurality of image (step S7). To be specific, the synthesis unit 6b executes, for example, block matching processing for matching the positions of plural pieces of image data obtained by the image obtaining unit 6a, and synthesizes partial image regions of the plurality of images (for example, images P1, Pn, and Pn+1 shown in FIGS. 5A and 5B) by superimposing and adding those partial regions of the plurality of images to generate a synthesis image (for example, a synthesis image Dn in FIGS. 5A and 5B).

Further, as synthesis image data is generated, the synthesis unit 6b reduces the generated synthesis image data by a given scale factor in both horizontal and vertical directions, and generates the reduced image data with low resolutions for display (step S8). The synthesis unit 6b has the image memory 5 store the synthesis image data and reduced image data generated. The display control unit 7 reads out the reduced image data stored in the image memory 5 and the displays the reduced image data on the display screen of the display unit 8 (step S9).

Next, based on feature point data which is stored previously (for example, feature point data of a facial image), the feature region detection unit 6d executes feature region detection processing for detecting an image region of the synthesis image as a feature region (for example, the feature region F shown in FIG. 6, and the like), the image region containing feature points which correspond to the feature point data (step S10).

The feature region judgment unit 6c then judges whether the feature region is contained in the synthesis image (step S11). Specifically, in a case where the feature region is detected by the feature region detection unit 6d in the synthesis image, the feature region judgment unit 6c judges that a feature region is contained in a synthesis image. On the contrary, when the feature region is not detected by the feature region detection unit 6d, the feature region judgment unit 6c judges that a feature region is not contained in a synthesis image.

In a case where it is judged that a feature region is not contained in a synthesis image at step S11 (NO at step S11), the central control unit 11 moves on to the processing of step S4.

Meanwhile, when it is judged at step S11 that a feature region is contained in a synthesis image (YES at step S11), the central control unit 11 causes notification that a feature region is contained in a synthesis image (step S12). Specifically, for example, the display control unit 7 has the display screen of the display unit 8 display the reduced image Hn corresponding to the synthesis image Dn, and also has the display screen of the display unit 8 display the indicator G which surrounds the periphery of an image region in the reduced image Hn, the image region corresponding to the feature region F in the synthesis image Dn (refer to FIG. 10).

Next, the feature region judgment unit 6c executes processing to judge capturing stopping conditions (step S13).

The processing to judge capturing stopping conditions will be explained with reference to the flowchart shown in FIG. 3.

First, the feature region judgment unit 6c judges whether a user has designated any composition (step S21). When it is judged that a composition has been designated by a user (YES at step 21), the feature region judgment unit 6c judges whether the user has designated a plurality of compositions (step S22).

When it is judged at the step S22 that a plurality of compositions has been designated by the user (YES at step 22), the alignment unit 6e, for example, aligns each of the plurality of designated compositions and the synthesis image as illustrated in FIG. 8 (step S23).

Thereafter, the feature region judgment unit 6c judges, for each of the plurality of compositions, whether the synthesis image generated by the synthesis unit 6b contains an image region having a feature region at a position specified by each of the compositions (step S24).

When it is judged at step S24 that the synthesis image contains an image region which has a feature region at a position specified by each of the compositions (YES at step S24), the central control unit 11 notifies that the synthesis image contains an image region having a feature region at a position specified for each of the plurality of designated compositions (step S25). A specific example is, as illustrated in FIG. 12, that the display control unit 7 causes the display screen of the display unit 8 to display a reduced image Hq which corresponds to the complete synthesis image data, as well as the indicator G which surrounds the periphery of an image region of the reduced image Hq, the image region corresponding to one detected as a feature region within the image region of the complete synthesis image data. At the same time, the display control unit 7 causes the display screen of the display unit 8 to display the indicator H which indicates that generation of the complete synthesis image data has been completed.

Next, the feature region judgment unit 6c judges that the capturing stopping conditions are satisfied (step S26), and the processing to judge capturing stopping conditions is ended.

Meanwhile, when it is judged that the synthesis image does not contain an image region having a feature region at a position specified by each of the compositions (NO at step S24), the feature region judgment unit 6c judges that the capturing stopping conditions are not satisfied (step S27), and the processing to judge capturing stopping conditions is ended.

Further, when it is judged at step S22 that a plurality of compositions are not designated by a user (No at step S22), in other words, when one composition is designated, the alignment unit 6e performs, for example, processing to align the designated composition and the synthesis image, as illustrated in FIGS. 7A and 7B (step S28).

Next, with regard to the designated composition, the feature region judgment unit 6c judges whether the synthesis image generated by the synthesis unit 6b contains an image region which has a feature region at a position specified by the composition (step S29).

When it is judged at step S29 that the synthesis image contains an image region which has a feature region at a position specified by the composition (YES at step S29), the central control unit 11 notifies that the synthesis image contains an image region having a feature region at a position specified by the designated composition (step S30). A specific example is, as illustrated in FIG. 11, that the display control unit 7 causes the display screen of the display unit 8 to display a reduced image Hm which corresponds to the complete synthesis image data, as well as the indicator G which surrounds the periphery of an image region of the reduced image Hm, the image region corresponding to one that is detected as a feature region within the image region of the complete synthesis image data. At the same time, the display control unit 7 causes the display screen of the display unit 8 to display the indicator H which indicates that generation of the complete synthesis image data has been completed.

Next, the feature region judgment unit 6c judges that the capturing stopping conditions are satisfied (step S26), and the processing to judge capturing stopping conditions is ended.

Meanwhile, when it is judged that the synthesis image does not contain an image region having a feature region at a position specified by the composition (NO at step S29), the feature region judgment unit 6c judges that the capturing stopping conditions are not satisfied (step S27), and the processing to judge capturing stopping conditions is ended.

When it is judged at step S21 that no composition has been designated by a user (NO at step S21), the feature region judgment unit 6c judges whether an instruction to stop capturing has been inputted through the operation input unit 10 (step S31). In a case where it is judged that an instruction input to stop capturing has been made here (YES at step S31), the feature region judgment unit 6c judges that the capturing stopping conditions are satisfied (step S26), and the processing to judge capturing stopping conditions is ended. On the other and, when it is judged at step S31 that an instruction input to stop capturing has not been made (NO at step S31), the feature region judgment unit 6c judges that the capturing stopping conditions are not satisfied (step S27), and the processing to judge capturing stopping conditions is ended.

After the processing to judge capturing stopping conditions, the capturing control unit 3 judges whether the capturing stopping conditions are satisfied (step S14). When it is judged here that the capturing stopping conditions are not satisfied (NO at step S14), the central control unit 11 moves on to the processing of step S4. In this case, after the central control unit 11 proceeds to step S4, a new image is captured and obtained through the processing at steps S5 and S6, and such image is further synthesized with the existing synthesis image at step S7. Therefore, a synthesis image generated by processing at step S7 after the control unit 11 proceeds to step S4 will become a synthesis image which contains an image region which is obtained as follows: an image region of the image that is newly captured and obtained, which does not overlap the previous synthesis image before proceeding to the processing of step S4, is added to the image region of the previous synthesis image before moving to the processing of S4.

On the other hand, when it is judged at step S14 that the capturing stopping conditions are satisfied (YES at step S14), the capturing control unit 3 stops capturing (step S15). Specifically, the capturing control unit 3 makes the electronic capturing unit 2 stop converting an optical image into an image signal. At the same time, the capturing control unit 3 causes the electronic capturing unit 2 to stop the processing of reading out an image frame for each screen from the capturing region thereof and outputting the image frame to image data generation unit 4.

Next, the cut-out image generation unit 6f generates cut-out image data obtained by cutting out a partial image region of the synthesis image, which contains a feature region (step S16), and the cut-out image generation processing is ended.

To be specific, as illustrated in FIGS. 9A and 9B, the cut-out image generation unit 6f, for example, cuts out a cut-out region from the complete synthesis image Dm in accordance with a designated composition (or each composition when more than one compositions is designated), outputs data which corresponds to the partial cut-out image (cut-out image W1) to the recording medium control unit 9, and has the recording medium 9a store the data as the cut-out image data. Also, when no composition is designated, the cut-out image generation unit 6f generates cut-out image data based on a given condition, such as a cut-out region, judged by an input made via the operation input unit 10.

As described so far, according to the capturing device 100 of the first embodiment, when it is judged by the feature region judgment unit 6c that a feature region is contained in a synthesis image, the display control unit 7 and the display unit 8 notify that a feature region is contained in a synthesis image. Therefore, a user is able to know that a feature region is contained in a synthesis image. This encourages a user to capture images of areas related to the feature region, and prevents wasteful capturing of areas that are not relevant or tenuously related to the feature region because a user does not notice that the feature region is contained in the synthesis image. Hence, a synthesis image can be generated by using a plurality of images captured by continuous capturing of areas related to a feature region, and a synthesis image can be generated more efficiently.

Further, since the cut-out image generation unit 6f cuts out a partial image region containing a feature region from a synthesis image generated by the synthesis unit 6b, a partial image region that contains a feature region after removal of unnecessary image region of the synthesis image can be obtained as a cut-out image. Also, a partial image region of a synthesis image, which is more relevant to a feature region, can be obtained as a cut-out image.

Also, the feature region judgment unit 6c judges whether a synthesis image contains an image region which has a feature region at a position specified by a composition designated through the operation input unit 10 every time the synthesis image is sequentially generated. When it is judged that an image region having a feature region is contained in the synthesis image, the display control unit 7 and the display unit 8 notify that a feature region is included in a synthesis image. Therefore, a user can be informed that capturing in accordance with a designated composition has been completed, and that it is thus no longer necessary to continue capturing to obtain images which correspond to the designated composition. This can properly prevent a user from doing useless capturing of areas that are irrelevant to the composition. Hence, a synthesis image can be generated by using a plurality of images captured by continuous capturing of areas related to a feature region, and a synthesis image can be generated more efficiently. Yet further, when it is judged by the feature region judgment unit 6c that a synthesis image contains an image region in a composition which includes a feature region, the capturing control unit 3 stops capturing. Therefore, capturing can be stopped automatically when capturing corresponding to a designated composition is completed, which can properly prevent a user from continuing wasteful capturing of areas unrelated to the composition. Hence, a synthesis image can be generated by using a plurality of images captured by continuous capturing of areas related to a feature region, and a synthesis image can be generated more efficiently.

For each of a plurality of compositions designated via the operation input unit 10, the feature region judgment unit 6c judges whether a synthesis image successively generated by the synthesis unit 6b contains an image region which has a feature region at a position specified by each of the compositions. When it is judged that a synthesis image contains an image region which has a feature region with regard to all of the plurality of designated compositions, the display control unit 7 and the display unit 8 notify that a feature region is contained in a synthesis image. Therefore, a user can be informed, with regard to all of the plurality of compositions designated, that capturing in accordance with each of the compositions has been completed, and that it is thus no longer necessary to continue capturing to obtain images which correspond to each of the compositions. This can properly prevent a user from doing useless capturing of areas that are irrelevant to the compositions. Hence, a synthesis image can be generated by using a plurality of images captured by continuous capturing of areas related to a feature region, and a synthesis image can be generated more efficiently.

Furthermore, image regions containing feature regions in all of a plurality of compositions can be obtained at once by capturing to generate a single synthesis image. This removes necessity for continuous capturing of common areas in more than one composition, and capturing to obtain an image based on a plurality of compositions can be performed more effectively.

Yet further, the capturing device 100 further includes the display unit 8 which displays a reduced image of a synthesis image which is successively generated by the synthesis unit 6b, and a feature region in a reduced image of a synthesis image displayed on the display unit 8 is shown in an identifiable manner of display. Therefore, a feature region contained in a synthesis image can be notified in a visually recognizable manner, and a user can be notified of a position of a feature region in a synthesis image. This encourages a user to capture areas related to the feature region, and prevents wasteful capturing of areas that are not relevant or tenuously related to the feature region because a user does not notice that the feature region is contained in the synthesis image. Hence, a synthesis image can be generated by using a plurality of images captured by continuous capturing of areas related to a feature region, and a synthesis image can be generated more efficiently. Moreover, since a feature region includes a facial region, a user can be informed when a facial image region is contained in a synthesis image, and a user can be notified that an image of a face has been captured while generating a synthesis image. This tells a user that a face is included in a synthesis image, which can encourage the user to carry out capturing based on a face (for example, capturing of a body and so on which is connected to the face) and properly prevent the user from performing wasteful capturing of areas unrelated to the facial region. Hence, a synthesis image can be generated by using a plurality of images captured by continuous capturing of areas related to a feature region, and a synthesis image can be generated more efficiently.

It is difficult to previously decide a region to be finally cut out from a synthesis image because an optimal composition differs depending on a type of a main subject contained in the synthesis image, a size of a main subject relative to a background region, and so on. Accordingly, when a feature region is contained in a synthesis image, a user is notified that a feature region is contained in a synthesis image. This can draw attention of a user to a composition based on the feature region. Thus, a region of a cut-out image can be determined corresponding to the composition based on the feature region, which can encourage a user to capture the areas corresponding to the cut-out region of the image only. In other words, wasteful capturing of areas which are not contained in the region of the cut-out image can be properly prevented. Hence, a synthesis image can be generated by using a plurality of images captured by continuous capturing of areas related to a feature region, and a synthesis image can be generated more efficiently. Further, if capturing of an area that is not contained in a region of a final cut-out image is continued unnecessarily, a considerably large synthesis image is generated by synthesizing images obtained from unnecessarily continued capturing, and a memory with an unnecessarily large space is required in order to store the very large synthesis image temporarily, causing cost increases. As previously stated, since the capturing device 100 can properly prevent unnecessary capturing of areas that are not included in a region of a cut-out image, a region which is not contained in a final cut-out image region in a synthesis image can be minimized, and a data size of a synthesis image can be reduced to a minimum level. Therefore, a storage space of a memory required for storing synthesis images can be small, thus reducing costs. Since the data size of a synthesis image is small, loads of various processing including processing for successive generation of synthesis images and cut-out processing can be reduced further, thus speeding up such processing.

Also, since a synthesis image containing a feature region can be obtained, a synthesis image can be generated which contains a feature region made of a wide image region that cannot be obtained from one image capture. Moreover, in a case where there is a limit to zoom scale in trying to keep a feature region within a region obtained from one image capture, image capture of the feature region is divided into multiple times. Thus, a synthesis image can be generated which contains a feature region with a higher definition captured at a higher zoom scale. This way, an image containing a feature region can be captured in variety of ways.

[Second Embodiment]

Next, a capturing device 200 according to a second embodiment will be explained. In addition to the characteristics of the capturing device 100 according to the first embodiment, the capturing device 200 has a characteristic that a capturing area is changed based on a position of a feature region in a synthesis image when it is judged that the synthesis image contains a feature region.

Figure 13:
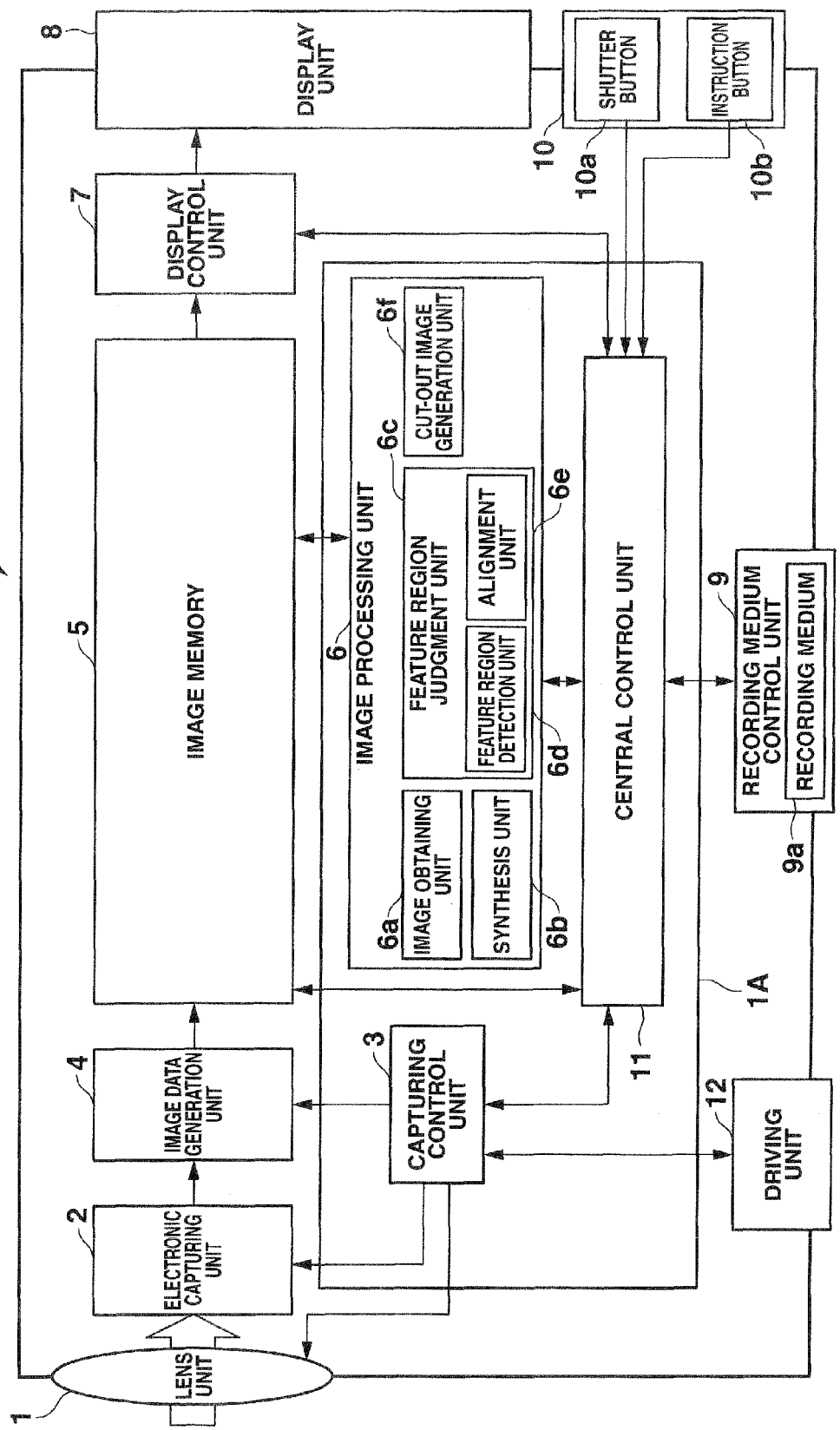
FIG. 13 is a block diagram showing a schematic configuration of a capturing device according to a second embodiment to which the present invention is applied.

FIG. 13 is a block diagram illustrating a schematic configuration of the capturing device 200 according to the second embodiment to which the present invention is applied. The constituents of the capturing device 200 similar to those of the capturing device 100 are denoted with the same numerals and explanation thereof is omitted.

The capturing device 200 according to the second embodiment further includes a driving unit 12 in addition to the configuration of the capturing device 100 of the first embodiment.

The driving unit 12 changes areas captured by the capturing device 200 under control of a capturing control unit 3.

Specifically, the driving unit 12 is, for example, an actuator which conducts operations to change orientation, angle, and so on of the capturing device 200 which is supported by a supporting part (not illustrated) such as a tripod stand that is connected to the capturing device 200. This means that the driving unit 12 changes an area of an optical image which passes thorough a lens unit 1, in other words, capturing areas, by changing orientations, angles, and so on of the lens unit 1 and an electronic capturing unit 2 with respect to the supporting part through the operations. Due to such operations of the driving unit 12, a plurality of pieces of image data can be automatically captured continuously based on a feature region without needing manual operations by a user to change position, angle, and so on of the capturing device 200.

When it is judged by a feature region judgment unit 6c that a feature region is contained in a synthesis image, a capturing control unit 3 according to the second embodiment changes capturing areas based on the position of the feature region in the synthesis image.

To be specific, for example, the capturing control unit 3 controls operations of the driving unit 12 so as to perform sequential capturing of a feature region and a region containing the periphery of the feature region, based on the orientation and angle of the lens unit 1 of the capturing device 200 when the feature region is captured. Simultaneously, the capturing control unit 3 causes the electronic capturing unit 2 to read out an image frame for each screen from the capturing region thereof and successively output the image frames to an image data generation unit 4. Thus, the capturing control unit 3 conducts continuous capturing while changing capturing areas.

After an instruction is inputted to begin continuous capturing, the capturing control unit 3 according to the second embodiment automatically conducts continuous capturing by conducting automatic control of operations of the lens unit 1, the electronic capturing unit 2, the driving unit 12, and so on. Then, when it is judged by the feature region judgment unit 6c that a feature region is contained in a synthesis image, the capturing control unit 3 changes capturing areas automatically based on the position of the feature region in the synthesis image.

The configuration of the base for the capturing device 200 to change capturing areas through the operations of the driving unit 12 is not limited to a tripod stand, and may be provided arbitrarily. For instance, like a surveillance camera, the capturing device 200 may be supported by a support member provided on an upper side of the capturing device in a manner that can change capturing areas.

The capturing device 200 may further include an identifying unit (for example, a triaxial sensor) for identifying orientation and angle of the lens unit 1. In this case, when a feature region is captured by the capturing unit (for example, the lens unit 1) in an orientation and at an angle identified by the identifying unit, the capturing control unit may identify the orientation and angle of the lens unit 1 of the capturing device 200 and control operations of the driving unit 12 so as to perform sequential capturing of the feature region and an area which contains the periphery of the feature region based on the identified angle. Also, the orientation and angle of the lens unit 1 may be identified by the identifying unit while the operations of the driving unit 12 are controlled, and the identified orientation and angle may be used for control of the operations of the driving unit 12 in order to conduct sequential capturing of the feature region and the area containing the periphery of the feature region.

The capturing control unit 3 may also change capturing areas captured by the capturing unit so that a synthesis image generated by a synthesis unit 6b includes an image region in a composition where a feature region is present at a given position.

Specifically, for example, when a composition is designated by an instruction input or the like through an operation input unit 10, the capturing control unit 3 controls operations of the driving unit 12 so that a synthesis image contains an image region in which a feature region is present at a position specified by the designated composition. At the same time, the capturing control unit 3 causes the electronic capturing unit 2 to read out an image frame for each screen from the capturing region thereof and successively output the image frames to the image data generation unit 4.

When it is judged whether a synthesis image contains an image region in a composition where a feature region is present at a given position every time the synthesis image is sequentially generated by the synthesis unit 6b, and when it is judged that a synthesis image contains an image region in a composition where a feature region exists at the given location, the capturing control unit 3 may stop capturing.

Specifically, for example, every time a synthesis image is generated by the synthesis unit 6b, a feature region detection unit 6d executes processing to detect a feature region. Based on the result of the feature region detection processing, it is judged by the feature region judgment unit 6c whether the synthesis image contains an image region in such a composition that includes a feature region. When it is judged that the synthesis image contains the image region in a composition which includes a feature region, the capturing control unit 3 may cause the electronic capturing unit 2 to stop conversion of an optical image into an image signal, and cause the electronic capturing unit 2 to stop the processing to read out an image frame for each screen from the capturing region thereof and output the image frame to the image data generation unit 4. The capturing control unit 3 may control changes of capturing areas and stops of capturing based on not only a composition designated through the operation input unit 10, but also a composition adopted in some way (for example, a preset composition), in which a feature region is present at a given position.

Further, changes of capturing areas by using the aforementioned driving unit 12 are only an example and the present invention is not limited thereto. For example, an actuator or the like may be provided which changes the positions and angles of the lens unit 1 and the electronic capturing unit 2 with respect to the capturing device 200, and the orientations, angles, and so on of the lens unit 1 and the electronic capturing unit 2 to the capturing device 200 may be changed as the capturing control unit 3 controls operations of the actuator.

Changes of capturing area are not limited to changes of orientations and angles of image capture. For example, the capturing control unit 3 may change capturing areas by changing a zoom level of the lens unit 1.

Next, cut-out image generation processing executed by the capturing device 200 according to the second embodiment will be explained with reference to the flowchart shown in FIG. 14. The processing steps similar to those of the capturing device 100 of the first embodiment will be given the same numerals and explanation thereof will be omitted.

The capturing device 200 according to the second embodiment executes processing of step S1 through step S3 which proceed like those of the capturing device 100 of the first embodiment.

In the capturing device 200 of the second embodiment, the capturing control unit 3 automatically changes capturing areas after the processing of step S3, in other words, after the first image is obtained (step S41). In the processing of step S41, the capturing control unit 3, for example, changes capturing areas depending on a given pattern for changing capturing areas. Here, the given pattern for changing capturing areas may be stored in a non-illustrated storage device (for example, a flash memory) and so on included in the capturing device 200 in advance, or may be set by a user through the operation input unit 10 or the like before starting capturing.

After the processing of step S41, the capturing device 200 according to the second embodiment proceeds to processing of step S4, in other words, processing to add 1 to the value of a counter n. The capturing device 200 according to the second embodiment executes processing of steps S4 through step S10 in a similar way to those executed by the capturing device 100 according to the first embodiment.

A judgment is made at step S11, in other words, a judgment is made by the feature region judgment unit 6c whether a synthesis image contains a feature region. When it is judged here that a synthesis image does not contain a feature region (No at step S11), the capturing device 200 of the second embodiment moves on to processing of step S41. That means, when it is judged that a feature region is not contained in a synthesis image, the capturing device 200 according to the second embodiment conducts consecutive capturing while the capturing control unit 3 continues to change capturing areas in accordance with a given pattern for changing capturing areas.

Meanwhile, when it is judged that a feature region is contained in a synthesis image in the judgment processing of step S11 (YES at step S11), the capturing device 200 according to the second embodiment makes notification similar to the capturing device 100 of the first embodiment, in other words, the notification that a feature region is contained in a synthesis image (step S12).

After the processing of step S12, the capturing device 200 according to the second embodiment causes the capturing control unit 3 to change capturing areas based on the feature region (step S42).

Specifically, for example, the capturing control unit 3 controls operations of the driving unit 12 so as to sequentially capture the feature region and an area containing the periphery of the feature region, based on the orientation and angle of the lens unit 1 of the capturing device 200 when the feature region is captured. Further, when a composition is designated, the capturing control unit 3 may control operations of the driving unit 12 such that a synthesis image contains an image region where a feature region is present at a position specified by the designated composition, in accordance with results of processing of step S23 and alignment processing at step S28.

After the processing of step S42, the capturing device 100 according to the second embodiment proceeds to processing of step S13, in other words, processing to judge capturing stopping conditions.

There is a judgment process at step S14 after the processing to judge capturing stopping conditions is ended, in other words, there is a judgment process conducted by the capturing control unit 3 regarding whether capturing stopping conditions are satisfied. When it is judged here that the capturing stopping conditions are not satisfied (NO at step S14), the central control unit 11 moves on to processing of step S4. That means, when it is judged that a feature region is contained in a synthesis image, the capturing device 200 of the second embodiment causes the capturing control unit 3 to terminate change of capturing areas in accordance with a given pattern of capturing area changes, and conducts consecutive capturing based on the feature region.

On the contrary, when it is judged at step S14 that the capturing stopping conditions are satisfied (YES at step S14), the capturing control unit 3 stops capturing (step S15) and generates cut-out image data (step S16) like the capturing device 100 of the first embodiment.

As described above, according to the capturing device 200 of the second embodiment, when it is judged by the feature region judgment unit 6c that a feature region is contained in a synthesis image, the capturing control unit 3 changes capturing areas captured by the capturing unit based on the position of the feature region in the synthesis image. Therefore, in addition to the effects produced by the capturing device 100 according to the first embodiment, a plurality of images captured based on the feature region can be obtained automatically, and a synthesis image made of the plurality of images captured based on the feature region can be easily generated. This means that areas irrelevant or tenuously related to the feature region are no longer captured wastefully, thus properly preventing useless capturing. Hence, a synthesis image can be generated by using a plurality of images captured by continuous capturing of areas related to a feature region, and a synthesis image can be generated more efficiently.

Further, the capturing control unit 3 changes capturing areas captured by the capturing unit such that a synthesis image contains an image region in a composition where a feature region is present at a given position. Therefore, capturing can be conducted automatically to generate a synthesis image which contains an image region in the composition, and, at the same time, areas that are not contained in the composition are no longer uselessly imaged, thus properly preventing wasteful capturing. Hence, a synthesis image can be generated by using a plurality of images captured by continuous capturing of areas related to a feature region, and a synthesis image can be generated more efficiently.

Yet further, the feature region judgment unit 6c judges whether a synthesis image contains an image area in a composition in which a feature region is present at a given position, and, when it is judged by the feature region judgment unit 6c that the synthesis image contains an image region in a composition in which a feature region is present at a given position, the capturing control unit 3 stops capturing.

Therefore, capturing can be automatically stopped at a point when capturing to generate a synthesis image containing an image region in said composition is completed. Therefore, continuous capturing of areas which are not contained in the composition is no longer uselessly conducted, thus properly preventing wasteful capturing. Hence, a synthesis image can be generated by using a plurality of images captured by continuous capturing of areas related to a feature region, and a synthesis image can be generated more efficiently.

Also, since the capturing control unit 3 controls capturing orientations, capturing areas can be changed based on a feature region without changing the position of the capturing device 200. Therefore, capturing areas can be changed even when capturing is performed without moving the capturing device 200 from a given position by, for example, supporting the capturing device 200 with a tripod stand, and the like.

It should be noted that the present invention is not limited to the aforementioned embodiments, and various improvements and design changes may be made without departing from the spirit and scope of the invention.

For example, a plurality of images used to generate a synthesis image may be captured in different zoom scales. An example thereof is that the capturing device 100 may obtain high-definition images in a relatively large zoom scale for a feature region and an image region containing the periphery of the feature region, and may obtain images in a relatively small scale for the rest of the regions of the synthesis image. In this case, it is preferred that the synthesis unit 6b execute image processing (reduction or enlargement) in order to unify the sizes of image regions corresponding to the plural pieces of image data to be synthesized.

The plurality of images used for generating a synthesis image may include a plurality of images captured by two or more capturing unit, respectively. For example, the capturing device may be provided with two or more lens units, electronic capturing units, and so on, and, a plurality of images may be generated by each of the lens units and electronic capturing units through continuous capturing by successively generating the plurality of images from frame images generated by each of the lens units and electronic capturing units.

Further, data such as reference data which contains information concerning a specific subject detected and judged as a feature region may be corresponded with feature point data. In this case, the reference data contains, for example, information which indicates the type of image region of the feature region detected and judged based on the feature point data. Also, pertaining to notification that a feature region is contained in a synthesis image, notification is made based on the reference data. For instance, in a case where an image region detected as a feature region is a facial region of one of user's family members, data of the family member is contained in the reference data, and, pertaining to notification that the facial region of the family member is contained in a synthesis image, it is notified that the feature region is contained in a synthesis image because an image of the user's family member is captured.

Furthermore, the configurations of the aforementioned embodiments are realized by, but not limited to, driving the image obtaining unit 6a, the synthesis unit 6b, the feature region judgment unit 6c of the image processing unit 6, the display control unit 7, the display unit 8, and so on under the control of the CPU of the central control unit 11. The configurations of the embodiments may also be realized by the CPU executing given programs.

Thus, a program memory (not illustrated) which stores programs may store programs including an obtaining routine, a generation routine, a judgment routine, and a notification routine. The obtaining routine may have the CPU successively obtain a plurality of images continuously captured by capturing unit. Further, the generation routine may have the CPU successively generate a synthesis image by superimposing and adding partial regions of the plurality of images obtained. Yet further, the judgment routine may have the CPU judge whether a synthesis image contains a feature region having a given feature every time a synthesis image is generated. Furthermore, the notification routine may have CPU notify that a feature region is contained in a synthesis image when the feature region is contained in the synthesis image.

Similarly, other processing executed by the other constituents of the capturing devices 100 and 200 may be realized by the CPU executing given programs, and the like.

Moreover, as a computer-readable medium which stores programs for executing the above-mentioned processing, a non-volatile memory such as a flash memory, and a portable recording medium such as a CD-ROM can be adopted in addition to a ROM, a hard disc, and so on.

What is claimed is:

1. An image processing device, comprising:
a processor which is configured to:
control an image sensor to successively capture a plurality of images;
partially superimpose the plurality of captured images to generate a synthesis image such that an additional one of the plurality of images is added to the synthesis image generated at that point, each time the image sensor captures the additional one of the plurality of images;
designate a composition which specifies a size of a composition region and a position of at least one predetermined feature region within the composition region, the composition region being an image region of the synthesis image to be generated, wherein the processor is configured to designate the composition before generation of a final synthesis image is completed;
successively judge, after an additional one of the plurality of images is added to the synthesis image, whether the synthesis image generated at that point contains the composition region having the size specified by the designated composition and including therein the predetermined feature region at the position specified by the designated composition, wherein the composition region is larger than an image region which can be acquired by a single image capture by the image sensor, and the composition region includes image data of the synthesis image corresponding at least partially to portions of the plurality of captured images which are superimposed with each other and at least a part of a most recently added additional one of the plurality of images which is not superimposed; and
control a predetermined processing to be executed when it is judged that the synthesis image contains the composition region having the size specified by the designated composition and including therein the predetermined feature region at the position specified by the designated composition, using the synthesis image generated at that point as the final synthesis image.

2. The image processing device according to claim 1, wherein the processor is further configured to cut out a partial image region of the generated synthesis image, the partial image region containing the feature region,
wherein, when the processor judges that the composition region is contained in the synthesis image, the processor cuts out the partial image region, using the synthesis image generated at that point.

3. The image processing device according to claim 1, wherein the processor stops performing synthesis when the composition region is judged to be contained in the synthesis image, and continues performing the synthesis while the composition region is judged not to be contained in the synthesis image.

4. The image processing device according to claim 1, wherein, when the processor judges that the composition region is contained in the synthesis image, the processor issues a notification indicating that the feature region is contained in the synthesis image.

5. The image processing device according to claim 4, wherein:
the processor judges whether the synthesis image contains the composition region every time the synthesis image is generated, and
when the processor judges that the synthesis image contains the composition region, the processor issues the notification indicating that the synthesis image contains the feature region.

6. The image processing device according to claim 1, wherein the processor stops capturing performed by the image sensor, when the processor judges that the synthesis image contains the composition region.

7. The image processing device according to claim 6, wherein, when the processor judges that the synthesis image contains the composition region with regard to all of the plurality of designated compositions the processor issues the notification indicating that the synthesis image contains the feature region.

8. The image processing device according to claim 1, wherein:
the processor further judges, for each of a plurality of designated compositions, whether the composition region is included in the generated synthesis image, and
when the processor judges that the synthesis image contains the composition region, the processor performs control to execute the predetermined processing using the synthesis image generated at that point.

9. The image processing device according to claim 1, wherein the processor changes an area to be captured by the image sensor, based on a position of the feature region in the synthesis image, when the processor judges that the feature region is contained in the synthesis image.

10. The image processing device according to claim 9, wherein the processor further changes an area to be captured by the image sensor so that the generated synthesis image contains the composition region.

11. The image processing device according to claim 10, wherein: the processer judges whether the synthesis image contains the composition region every time the synthesis image is generated by the processor, and the processor stops capturing performed by the image sensor, when the processor judges that the synthesis image contains the composition region.

12. The image processing device according to claim 9, wherein the processor controls a capturing orientation of the image sensor.

13. The image processing device according to claim 1, further comprising a display which displays the synthesis image generated by the processor, wherein the processor issues the notification indicating that the feature region is contained in the synthesis image, by displaying the feature region on the synthesis image displayed by the display in an identifiable form of display.

14. The image processing device according to claim 1, wherein the feature region includes a facial region.

15. The image processing device according to claim 1, wherein:
the processor arbitrarily designates both of a kind of the predetermined feature region and the position of the predetermined feature region, independently, in the composition region, by designation of the composition, and
the processor judges whether the synthesis image contains the composition region having the predetermined feature region of the designated kind at the designated position, when the synthesis image is generated.

16. The image processing device according to claim 1, wherein:
the processor simultaneously designates a plurality of compositions in each of which the predetermined feature region has a different size and a different position in the composition region, and
when the synthesis image is generated, the processor judges whether the synthesis image contains a composition region having the predetermined feature region of the size specified by any of the compositions, at the position specified by the any of the compositions, the compositions being designated by the processor.

17. The image processing device according to claim 1, wherein the processor issues the notification indicating that the composition region is contained in the synthesis image before superimposing a subsequent additional one of the plurality of images and when it is judged that the composition region is contained in the synthesis image.

18. The image processing device according to claim 1, wherein:
the designated composition further specifies a size of the predetermined feature region in the composition region, and
the processor judges, each time the additional one of the plurality of images is added to the synthesis image, whether the synthesis image generated at that point contains the composition region having the size specified by the designated composition and including the predetermined feature region at the position and having the size specified by the designated composition.

19. An image processing method by an image processing device, the method comprising:
successively capturing a plurality of images with an image sensor;
designating a composition which specifies a size of a composition region and a position of a predetermined feature region within the composition region, the composition region being an image region of a synthesis image to be generated by partially superimposing the plurality of captured images, wherein the composition is designated before generation of a final synthesis image is completed;
partially superimposing the plurality of captured images to generate the synthesis image such that an additional one of the plurality of images is added to the synthesis image generated at that point, each time the additional one of the plurality of images is captured;
successively judging, after an additional one of the plurality of images is added to the synthesis image, whether the synthesis image generated at that point contains the composition region having the size specified by the designated composition and including therein the predetermined feature region at the position specified by the designated composition, wherein the composition region is larger than an image region which can be acquired by a single image capture by the image sensor, and the composition region includes image data of the synthesis image corresponding at least partially to portions of the plurality of captured images which are superimposed with each other and at least a part of a most recently added additional one of the plurality of images which is not superimposed; and
controlling a predetermined processing be executed when the synthesis image is judged to contain the composition region having the size specified by the designated composition and including therein the predetermined feature region at the position specified by the designated composition, using the synthesis image generated at that point as the final synthesis image.

20. A non-transitory computer-readable medium having stored thereon a program that is executable by a computer of an image processing device to cause the computer to perform functions comprising:
successively capturing a plurality of images with an image sensor;
designating a composition which specifies a size of a composition region and a position of a predetermined feature region within the composition region, the composition region being an image region of a synthesis image to be generated by partially superimposing the plurality of captured images, wherein the composition is designated before generation of a final synthesis image is completed;
partially superimposing the plurality of captured images to generate the synthesis image such that an additional one of the plurality of images is added to the synthesis image generated at that point, each time the additional one of the plurality of images is captured;

successively judging, after an additional one of the plurality of images is added to the synthesis image, whether the synthesis image generated at that point contains the composition region having the size specified by the designated composition and including therein the predetermined feature region at the position specified by the designated composition, wherein the composition region is larger than an image region which can be acquired by a single image capture by the image sensor, and the composition region includes image data of the synthesis image corresponding at least partially to portions of the plurality of captured images which are superimposed with each other and at least a part of a most recently added additional one of the plurality of images which is not superimposed; and controlling a predetermined processing be executed when the synthesis image is judged to contain the composition region having the size specified by the designated composition and including therein the predetermined feature region at the position specified by the designated composition, using the synthesis image generated at that point as the final synthesis image.

\* \* \* \* \*